(12) United States Patent
Chou et al.

(10) Patent No.: US 11,320,945 B1
(45) Date of Patent: May 3, 2022

(54) TOUCH PANEL

(71) Applicants: Interface Technology (ChengDu) Co., Ltd., Sichuan (CN); Interface Optoelectronics (ShenZhen) Co., Ltd., Guangdong (CN); Interface Optoelectronics (Wuxi) Co., Ltd., Suzhou (CN); General Interface Solution Limited, Miaoli County (TW)

(72) Inventors: Hsien-Ying Chou, Guangdong (CN); Po-Lun Chen, Guangdong (CN); Chun-Ta Chen, Guangdong (CN); Chih-Lin Liao, Guangdong (CN); Fu-Cheng Wei, Guangdong (CN); Po-Ching Lin, Guangdong (CN)

(73) Assignees: Interface Technology (ChengDu) Co., Ltd., Sichuan (CN); Interface Optoelectronics (ShenZhen) Co., Ltd., Guangdong (CN); Interface Optoelectronics (Wuxi) Co., Ltd., Jiangsu (CN); General Interface Solution Limited, Miaoli County (TW)

( * ) Notice: Subject to any disclaimer, the term of this patent is extended or adjusted under 35 U.S.C. 154(b) by 0 days.

(21) Appl. No.: 17/306,962

(22) Filed: May 4, 2021

(30) Foreign Application Priority Data

Mar. 4, 2021 (CN) .......................... 202110239543.9

(51) Int. Cl.
*G06F 3/044* (2006.01)
*G06F 3/041* (2006.01)

(52) U.S. Cl.
CPC .......... *G06F 3/0445* (2019.05); *G06F 3/0412* (2013.01)

(58) Field of Classification Search
CPC ............................. G06F 3/0412; G06F 3/0445
USPC ........................................................ 345/173
See application file for complete search history.

(56) References Cited

U.S. PATENT DOCUMENTS

| 9,141,236 | B2* | 9/2015 | Lai ........................ G06F 3/0443 |
| 2017/0294543 | A1* | 10/2017 | Yamazaki ........... H01L 27/1229 |
| 2019/0354241 | A1* | 11/2019 | Kim ..................... G06F 3/04182 |
| 2019/0377450 | A1* | 12/2019 | Xu ........................... G06F 3/044 |

* cited by examiner

*Primary Examiner* — Calvin C Ma
(74) *Attorney, Agent, or Firm* — CKC & Partners Co., LLC

(57) ABSTRACT

A touch panel includes a substrate, a first electrode layer, and a second electrode layer. The first electrode layer is disposed over the substrate. The first electrode layer includes a plurality of first receiving electrodes, and the first receiving electrodes are separated from each other, extend along a first direction, and are arranged along a second direction substantially perpendicular to the first direction. The second electrode layer is disposed over the substrate and is electrically insulated from the first electrode layer. The second electrode layer includes a driving electrode and a second receiving electrode. The driving electrode extends along the first direction. The second receiving electrode is separated from the driving electrode and extends along the first direction.

20 Claims, 23 Drawing Sheets

TOUCH PANEL

CROSS-REFERENCE TO RELATED APPLICATION

This application claims priority to China application No. 202110239543.9, filed on Mar. 4, 2021, which is herein incorporated by reference.

BACKGROUND

Field of Invention

The present invention relates to a touch panel. More particularly, the present invention relates to the touch panel which can detect a touch of a non-conductor object.

Description of Related Art

With the development of touch panel technology, capacitive touch panels, resistive touch panels, electromagnetic touch panels or image sensor touch panels and so on have been developed. Capacitive touch panels formed by an embedded method are often unable to detect a touch of a non-conductor object. Therefore, there is a demand for a novel structure to solve the above problem.

SUMMARY

One aspect of the present disclosure is to provide a touch panel. The touch panel includes a substrate, a first electrode layer and a second electrode layer. The first electrode layer is disposed over the substrate. The first electrode layer includes a plurality of first receiving electrodes. The first receiving electrodes are separated from each other, extend along a first direction, and are arranged along a second direction substantially perpendicular to the first direction. The second electrode layer is disposed over the substrate and is electrically insulated from the first electrode layer. The second electrode layer includes a driving electrode and a second receiving electrode. The driving electrode extends along the first direction. The second receiving electrode is separated from the driving electrode and extends along the first direction, in which each of the first receiving electrodes has a first projection on the substrate, the driving electrode has a second projection on the substrate, the second receiving electrode has a third projection on the substrate, and the first projection, the second projection and the third projection are spaced apart from each other.

In some embodiments, the touch panel further includes a driving electrode line, a first receiving line and a second receiving line. The driving electrode line connects to the driving electrode and extends along the second direction to the touch sensor unit. The first receiving line connects to the first receiving electrodes and extends along the second direction to the touch sensor unit. The second receiving line connects to the second receiving electrode and extends along the second direction to the touch sensor unit.

In some embodiments, each of the plurality of first receiving electrodes has a first length, the driving electrode has a second length, and the first length is less than the second length.

In some embodiments, the driving electrode has a first length, the second receiving electrode has a second length, and the first length is substantially equal to the second length.

In some embodiments, the touch panel further includes a thin film transistor disposed on the substrate, in which the thin film transistor has a fourth projection on the substrate, and the fourth projection overlaps the second projection.

In some embodiments, the touch panel further includes a thin film transistor disposed on the substrate, in which the thin film transistor has a fourth projection on the substrate, and the fourth projection overlaps the third projection.

In some embodiments, the touch panel further includes a plurality of thin film transistors disposed on the substrate, in which each of the thin film transistors has a fourth projection on the substrate, the fourth projection overlaps the second projection, and the fourth projection overlap the third projection.

In some embodiments, the touch panel further includes a light emitting diode disposed between the thin film transistors and the driving electrode.

In some embodiments, the touch panel further includes a light emitting diode disposed between the thin film transistors and the second receiving electrode.

In some embodiments, the second electrode layer is disposed over the first electrode layer.

In some embodiments, the touch panel further includes a plurality of thin film transistors disposed on the substrate, in which thin film transistors are alternately disposed with the first receiving electrodes of the first electrode layer.

In some embodiments, the first electrode layer is disposed over the second electrode layer.

In some embodiments, the touch panel further includes a plurality of thin film transistors disposed on the substrate, in which the thin film transistors are alternately disposed with the driving electrode of the second electrode layer and the second receiving electrode.

In some embodiments, the touch panel further includes a light emitting diode disposed between a plurality of thin film transistors and the first receiving electrodes.

In some embodiments, the touch panel further includes a thin film transistor disposed on the substrate, in which the thin film transistor has a fourth projection on the substrate, and the fourth projection overlaps the first projection.

In some embodiments, the touch panel further includes a thin film transistor disposed on the substrate, in which the thin film transistor has a fourth projection on the substrate, and the fourth projection and the second projection are alternately disposed with the third projection.

In some embodiments, the touch panel further includes a first insulating film disposed between the first electrode layer and the second electrode layer.

In some embodiments, the first electrode layer is disposed over the first insulating film, and the second electrode layer is disposed between the substrate and the first insulating film.

In some embodiments, the second electrode layer is disposed over the first insulating film, and the first electrode layer is disposed between the substrate and the first insulating film.

In some embodiments, the touch panel further includes a second insulating film disposed between the first electrode layer and the substrate.

Hereinafter, the above description will be described in detail with embodiments, and a further explanation will be provided for the technical solution of the present disclosure.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
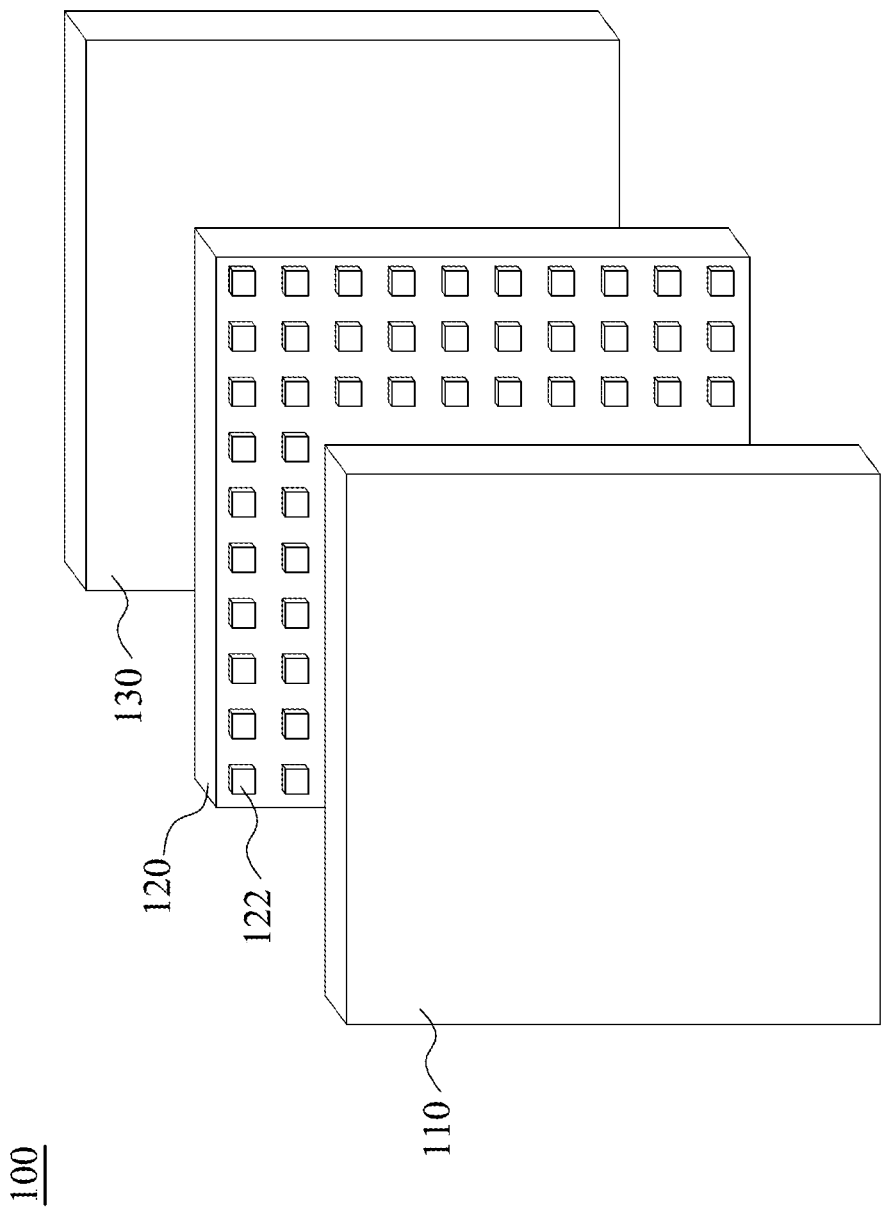
FIG. 1 is a schematic diagram illustrating a tiled light emitting diode module in accordance with some embodiments of the present disclosure.

Hereinafter, an illustrative description for the implementation aspects and specific embodiments of the present invention are provided to make the description of the present disclosure more detailed and complete. However, this is not the only manner to implement or use specific embodiments of the present invention. The embodiments disclosed below could be combined or substituted with each other under beneficial circumstances, and other embodiments could also be added to an embodiment without further description.

In the following description, many specific details will be described in detail so that the reader can fully understand the following embodiments. However, the embodiments of the present invention may be practiced without these specific details. In other circumstances, in order to simplify the drawings, some structures and devices are only schematically shown in the drawings.

Please refer to FIG. 1. FIG. 1 is a schematic diagram illustrating a tiled light emitting diode module 100 in accordance with some embodiments of the present disclosure. The tiled light emitting diode module 100 includes a cover 110, a display panel 120, and a support plate 130. The display panel 120 is disposed over the support plate 130, and the cover 110 is disposed over the display panel 120. In other words, the display panel 120 is disposed between the cover 110 and the support plate 130. In some embodiments, the cover 110 can be formed by transparent and insulating polymer materials, but not limited thereto. For example, polymer materials can be polyethylene terephthalate (PET), polyimide (PI), polyethylene naphthalate (PEN), polyether sulfone (PES), polyether ether ketone (PEEK), polycarbonate (PC), polypropylene (PP), polyamide (PA) or polymethyl methacrylate (PMMA). In some embodiments, the display panel 120 includes multiples light emitting diodes (LEDs) 122, as shown in FIG. 1. In some embodiments, the tiled light emitting diode module 100 further includes a touch panel (not shown) which is arranged around the light emitting diodes 122 to form a touch display panel. In some embodiments, an adhesive layer (not shown) is disposed between the support plate 130 and the display panel 120 and/or between the display panel 120 and the cover 110. In some embodiments, a material of the adhesive layer includes optically clear adhesive (OCA) and optically clear resin (OCR), but not limited thereto. In some embodiments, the support plate 130 can be a glass substrate, a polymer substrate or a silicon substrate, but not limited thereto.

Figure 2:
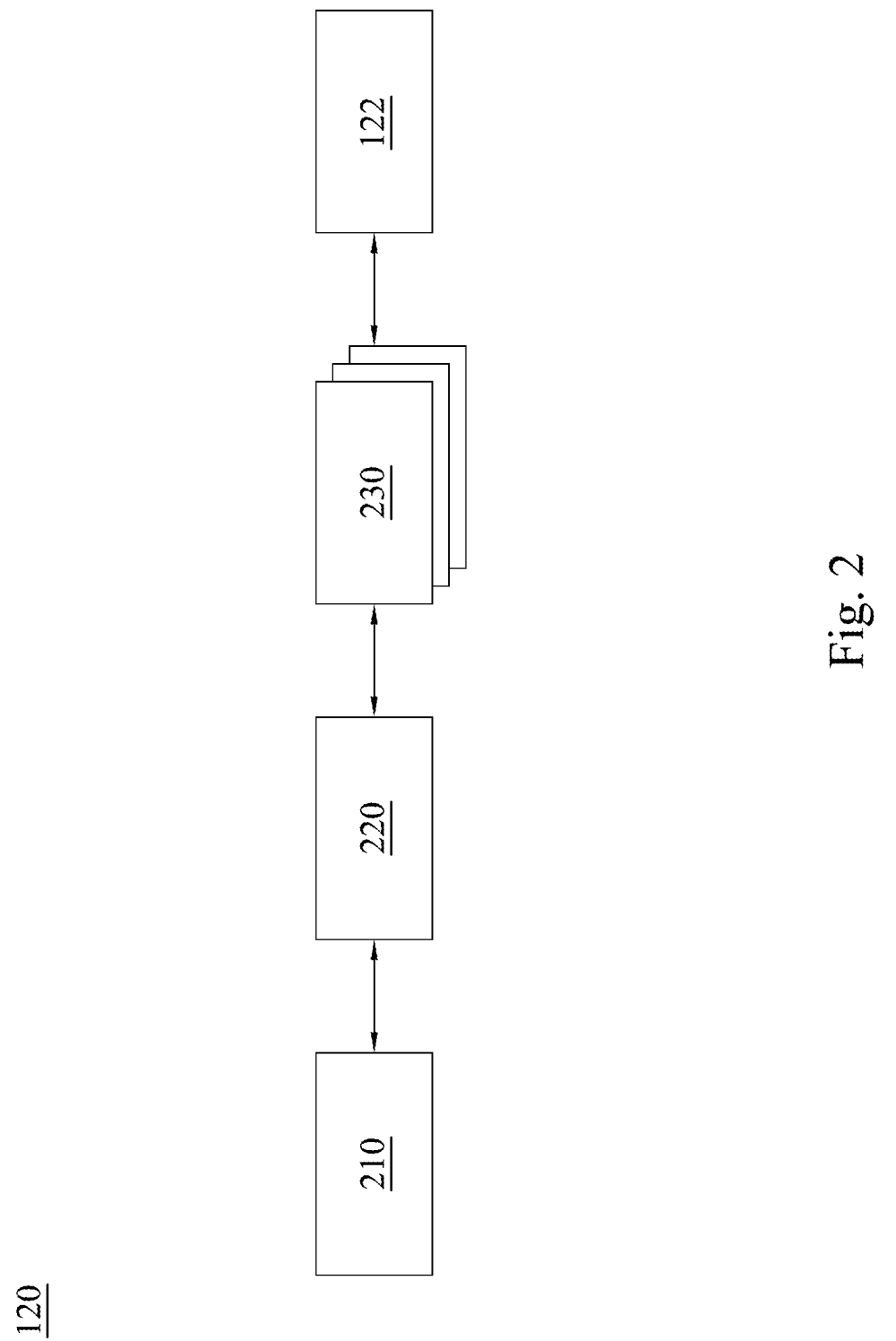
FIG. 2 is a block diagram illustrating internal components of a display panel in accordance with some embodiments of the present disclosure.

Please refer to FIG. 2. FIG. 2 is a block diagram illustrating internal components of the display panel 120 in accordance with some embodiments of the present disclosure. As shown in FIG. 2, the display panel 120 includes a processor 210, a timing controller 220, multiple drivers 230 and the light emitting diode 122. The processor 210 can include at least one of a central processing unit (CPU), a communications processor or an advanced reduced instruction set computer (RISC) machine (ARM) processor. The timing controller 220 can obtain image signals from the processor 210. The image signals can be, for example, an input signal (IS), a horizontal sync signal (Hsync), a vertical sync signal (Vsync), a master clock signal (MCLK), a scanning control signal, a data control signal or a light control signal. The timing controller 220 can provide image signals to each driver 230. The timing controller 220 can control display modules 510a~510f (shown in FIG. 5) by controlling multiple drivers 210. The driver 210 provides control signals to control multiple control lines formed on a front surface of a thin film transistor (TFT) substrate. The driver 210 can also transmit the provided control signals to each light emitting diode 122 connected to the corresponding lines. The light emitting diodes 122 can be micro light emitting diodes (micro LEDs) or mini light emitting diodes (mini LEDs), but not limited thereto.

Figure 3:
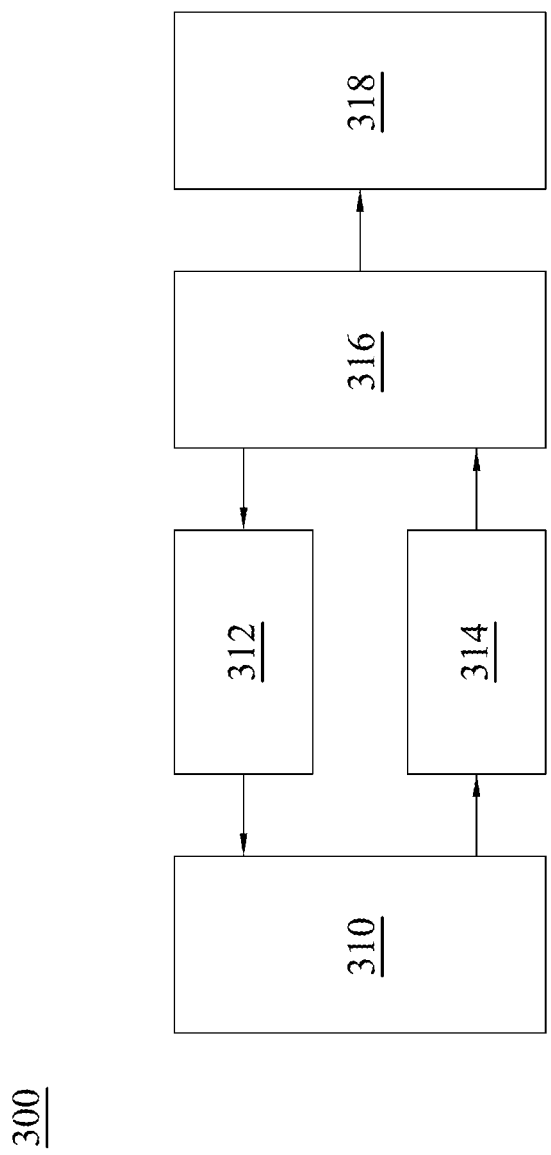
FIG. 3 is a block diagram illustrating a computer system including a touch panel in accordance with some embodiments of the present disclosure.

FIG. 3 is a block diagram illustrating a computer system 300 including a touch panel 310 in accordance with some embodiments of the present disclosure. The computer system 300 can be a smart phone, a desktop computer, a tablet computer, or similar devices. The computer system 300 includes a touch panel 310, a driving electrode 312, a receiving electrode 314, a digital controller 316 and an embedded system 318. The touch panel 310 includes an electrode array, and please refers to the following description for its design. Various software algorithms can be used in the digital controller 316 in the computer system 300 to have the functions of touch detection and/or signal control. The digital controller 316 transmits the signals to the driving electrode 312 so that the driving electrode 312 provides driving signals to the touch panel 310. When the touch panel 310 receives a touch by a conductive or non-conductive object, it transmits the signal received by the receiving electrode 314 to the digital controller 316. The digital controller 316 can determine whether a touch occurs and determine the touch location based on the touch point. The digital controller 316 transmits the determined signal to the embedded system 318 via the transmission line. The embedded system 318 is an integration of the display panel and the operating system, and the embedded system 318 is connected to the processor 210 of the display panel 120. Therefore, the embedded system 318 can determine the touch location.

Figure 4:
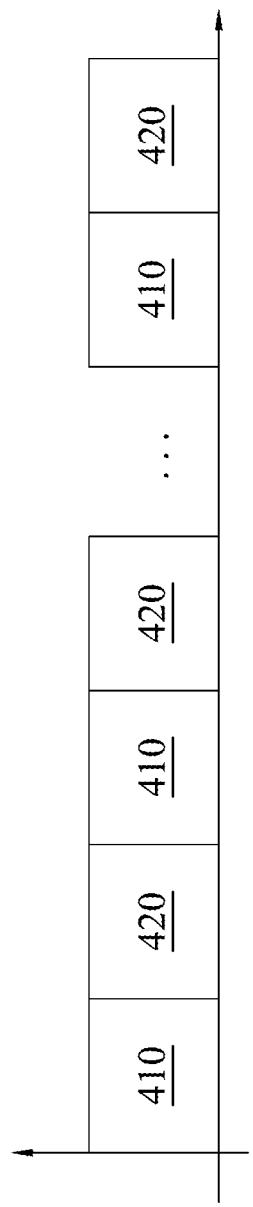
FIG. 4 is a schematic diagram illustrating a drive control timing diagram in accordance with some embodiments of the present disclosure.

Please refer to FIG. 4. FIG. 4 is a schematic diagram illustrating a drive control timing diagram of the touch panel 310 in accordance with some embodiments of the present disclosure. Specifically, FIG. 4 shows the drive control timing diagram of an embedded touch panel. A frame of the drive control timing is composed of multiple image display periods 410 and multiple touch sensing periods 420. During the image display periods 410, a common voltage is supplied to the driving electrode 312 and the receiving electrode 314 of the touch panel 310. During the touch sensing periods 420, a touch sensing signal is supplied to the driving electrode 312 of the touch panel 310, and a reference voltage is supplied to the receiving electrode 314 of the touch panel 310.

Figure 5:
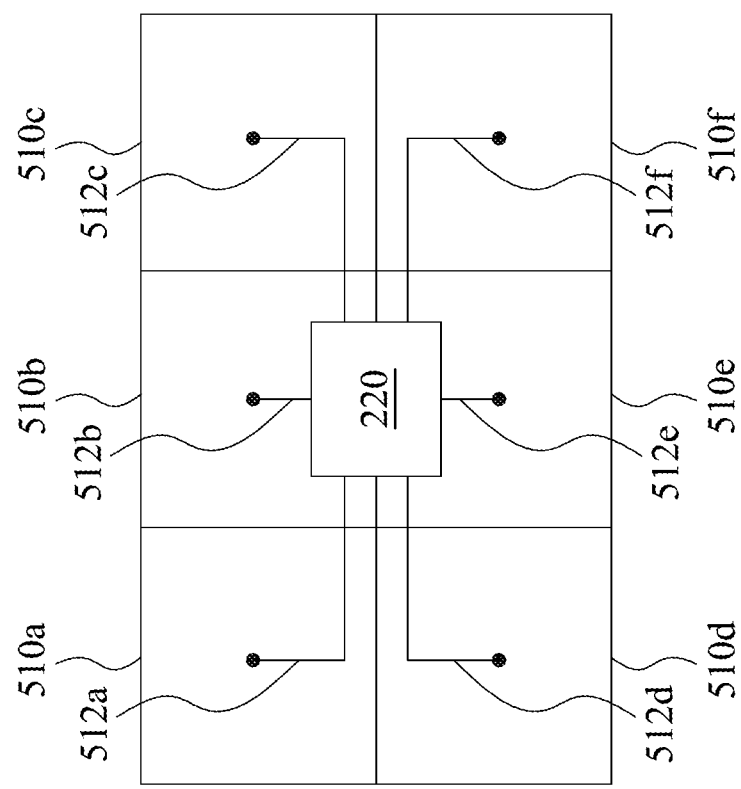
FIG. 5 is a schematic diagram illustrating multiple display modules and a timing controller in a touch panel in accordance with some embodiments of the present disclosure.

Please refer to FIG. 5. FIG. 5 is a schematic diagram illustrating multiple display modules 510a~510f and the timing controller 220 in the touch panel 310 in accordance with some embodiments of the present disclosure. The timing controller 220 can be connected to a display module 510a via a an electrical path 512a, connected to a display module 510b via an electrical path 512b, connected to a display module 510c via an electrical path 512c, connected to a display module 510d via an electrical path 512d, connected to a display module 510e via an electrical path 512e, and connected to a display module 510f via an electrical path 512f at the same time. The electrical paths 512a~512f include power and signals provided by the timing controller 220 to the driver 210. It should be understood that the number of display modules in FIG. 5 is merely exemplary, and is not intended to limit the present disclosure.

Figure 6:
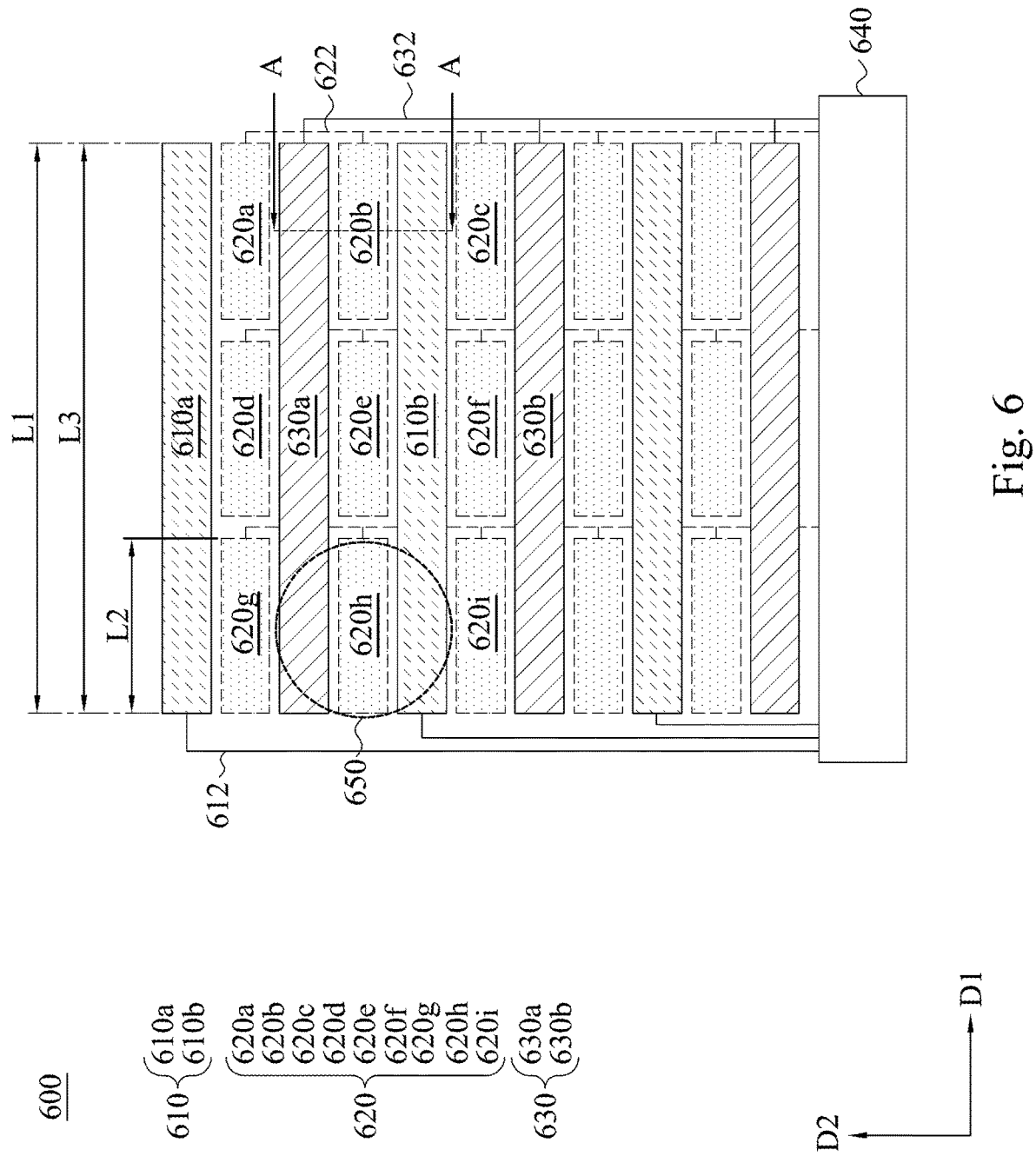
FIG. 6 is a top view of a touch panel in accordance with some embodiments of the present disclosure.
Figure 7:
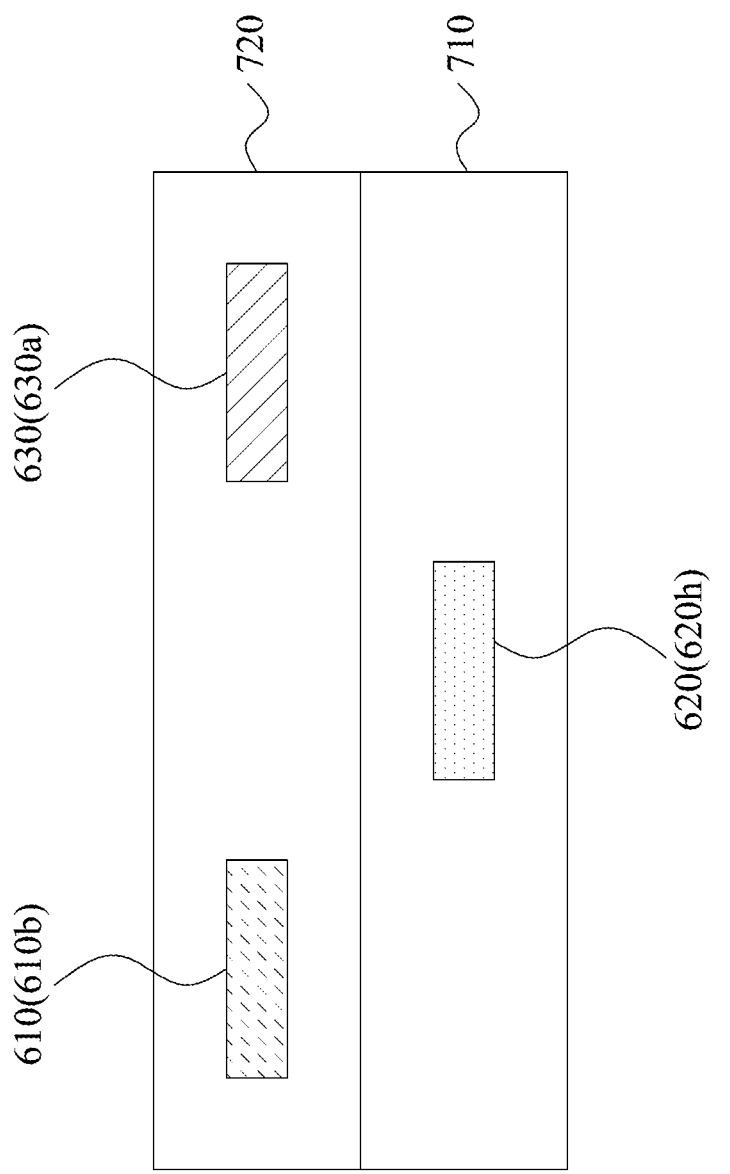
FIG. 7 is a schematic diagram illustrating a relative relationship of a first electrode layer and a second electrode layer in accordance with a line A-A in FIG. 6.

FIG. 6 is a top view of a touch panel 600 in accordance with some embodiments of the present disclosure. FIG. 7 is a schematic diagram illustrating a relative relationship of a first electrode layer 710 and a second electrode layer 720 in accordance with a line A-A in FIG. 6. The structure of the touch panel 600 will be described in detail below.

Please refer to FIG. 6 and FIG. 7. The touch panel 600 includes a driving electrode 610, a first receiving electrode 620, a second receiving electrode 630 and a touch sensor unit 640. The driving electrode 610 includes a driving electrode 610a or a driving electrode 610b. The first receiving electrodes 620 includes one of the first receiving electrodes 620a~620i. The second receiving electrode 630 includes a second receiving electrode 630a or a second receiving electrode 630b. As shown in FIG. 7, the first receiving electrode 620 (620h) is located in the first electrode layer 710, the driving electrode 610 (610b) and the second receiving electrode 630 (630a) are located in the second electrode layer 720. The second electrode layer 720 is located over the first electrode layer 710. The first receiving electrode 620 in FIG. 6 is shown as dashed lines, which represents the first receiving electrode 620 is located under the driving electrode 610 and the second receiving electrodes 630. The touch sensor unit 640 includes a driver integrated circuit (driver IC) 2100 (shown in FIG. 21) and a receiving integrated circuit (receiving IC)(not shown).

The arrangement of various electrodes in the touch panel 600 can be seen in FIG. 6. Specifically, the arrangement sequence of various electrodes is the driving electrode 610a, multiple first receiving electrodes 620 (including 620a, 620d and 620g), the second receiving electrode 630a, multiple first receiving electrodes 620 (including 620b, 620e and 620h). An electrode array of the touch panel 600 is formed by repeating the above-mentioned arrangement sequence.

Still refer to FIG. 6. In some embodiments, the driving electrode 610 has a length L1, the second receiving electrode 630 has a length L3, and the length L1 is substantially equal to the length L3. However, in other embodiments, the length L1 can be smaller or greater than the length L3. In some embodiments, each first receiving electrode 620 (i.e. the first receiving electrodes 620a~620i) has a length L2, the driving electrode 610 has a length L1, and the length L2 is smaller than the length L1. In some embodiments, the length L1 is about equal to three times the length L2.

In some embodiments, the touch panel 600 further includes a driving electrode line 612, a first receiving line 622 and a second receiving line 632. The driving electrode line 612 connects to the driving electrode 610, and extends along a second direction D2 to the touch sensor unit 640. The first receiving line 622 connects to multiple first receiving electrodes 620, and extends along the second direction D2 to the touch sensor unit 640. The second receiving line 632 connects to the second receiving electrode 630, and extends along the second direction D2 to the touch sensor unit 640. Specifically, the first receiving electrodes 620a, 620b, 620c connect to one first receiving line 622, the first receiving electrodes 620d, 620e, 620f connect to one first receiving line 622, and the first receiving electrodes 620g, 620h, 620i connect to one first receiving line 622, as shown in FIG. 6.

In one embodiment, the touch panel 600 includes 18 driving electrode lines 612, 38 first receiving lines 622 and one second receiving line 632. Since the second receiving electrode 630 of the touch panel 600 is a common receiving electrode, multiple second receiving electrodes 630a, 630b connect to one second receiving line 632. Comparing to conventional touch panels, the touch panels of the present disclosure can reduce the number of the first receiving lines 622 and the second receiving line 632. This is because multiple first receiving electrodes 620 share one first receiving line 622, and multiple second receiving electrodes 630a, 630b share one second receiving line 632. As a result, the touch panels of the present disclosure can reduce the number of the driver integrated circuits, thereby reducing the production cost.

Figure 8:
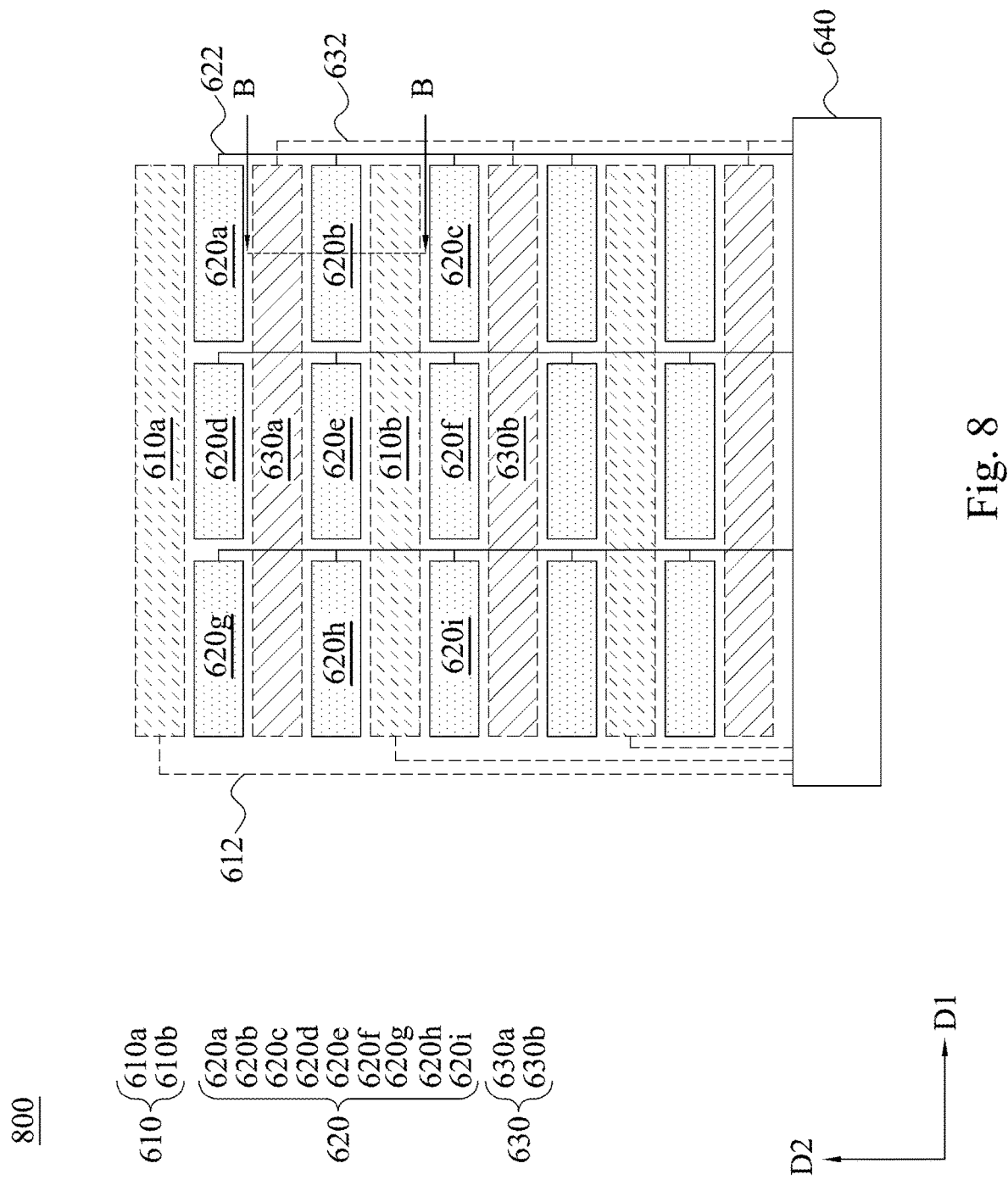
FIG. 8 and FIG. 9 are top views of touch panels in accordance with some embodiments of the present disclosure.
Figure 9:
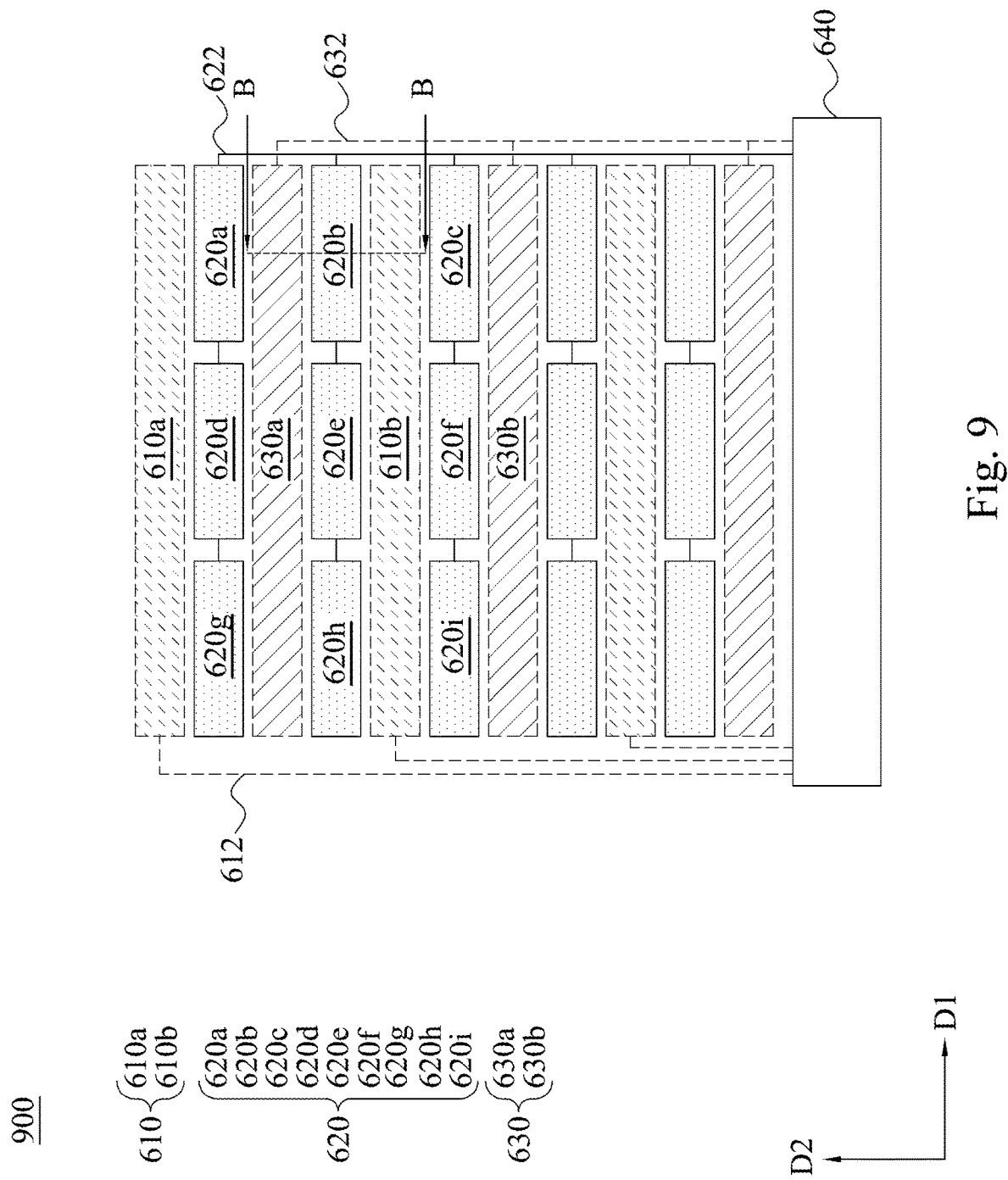
Figure 10:
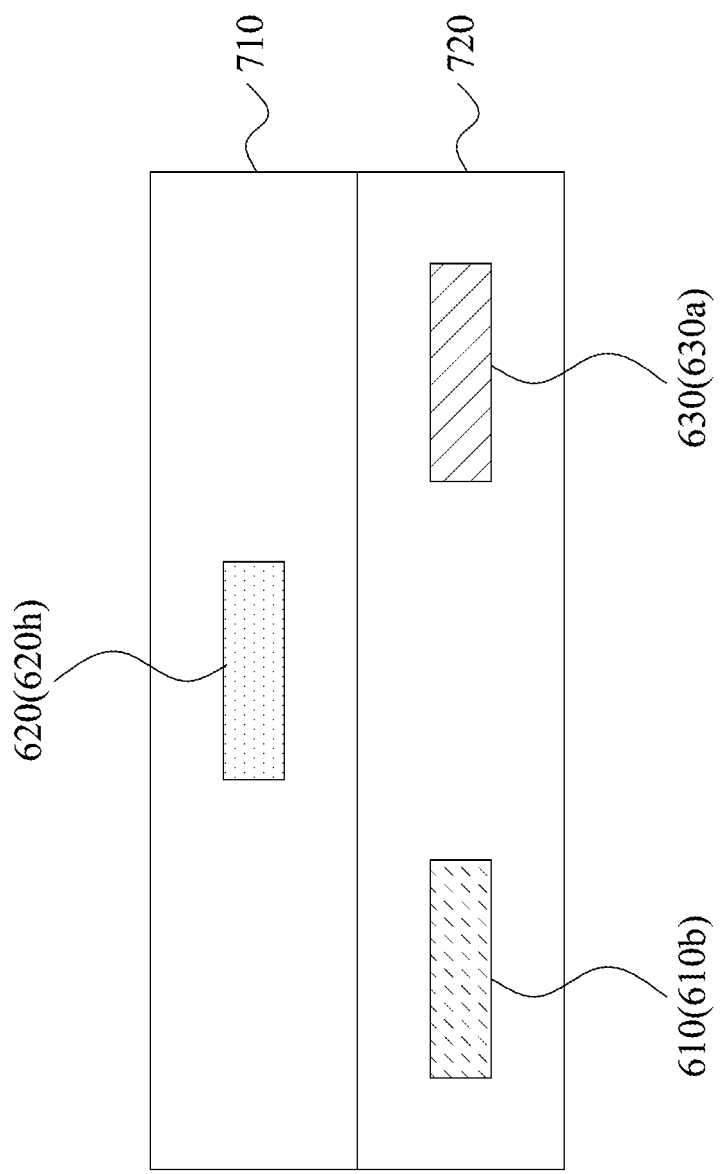
FIG. 10 is a schematic diagram illustrating a relative relationship of a first electrode layer and a second electrode layer in accordance with lines B-B in FIG. 8 and FIG. 9.

FIG. 8 and FIG. 9 are top views of touch panels 800, 900 in accordance with some embodiments of the present disclosure. FIG. 10 is a schematic diagram illustrating a relative relationship of the first electrode layer 710 and the second electrode layer 720 in accordance with lines B-B in FIG. 8 and FIG. 9. The structure of the touch panel 800 and the touch panel 900 will be described in detail below.

Please refer to FIG. 8 to FIG. 10. The touch panel 800 includes the driving electrode 610, the first receiving electrode 620, the second receiving electrode 630 and the touch sensor unit 640. The driving electrode 610 includes the driving electrode 610a or the driving electrode 610b. The first receiving electrode 620 includes one of the first receiving electrodes 620a~620i. The second receiving electrode 630 includes the second receiving electrode 630a or the second receiving electrode 630b. As shown in FIG. 10, the first receiving electrode 620 (620h) is located in the first electrode layer 710, the driving electrode 610 (610b) and the second receiving electrode 630 (630a) are located in the second electrode layer 720. The first electrode layer 710 is located over the second electrode layer 720. The driving electrode 610 and the second receiving electrode 630 in FIG. 8 and FIG. 9 are shown as dashed lines, which represents the driving electrode 610 and the second receiving electrode 630 are located under the first receiving electrode 620. The configurations of the touch sensor unit 640, the driving electrode line 612, the first receiving line 622 and the second receiving line 632 are described hereinabove, and the details thereof are not repeatedly described.

It should be understood that the touch panel 800 in FIG. 8 and the touch panel 600 in FIG. 6 are similar, and the arrangement sequence of various electrodes and the connection relationship of the electrode lines are also the same. The difference between the touch panel 800 in FIG. 8 and the touch panel 600 in FIG. 6 merely is the relative relationship between the first electrode layer 710 (i.e. the first receiving electrode 620) and the second electrode layer 720 (i.e. the driving electrode 610 and the second receiving electrode 630). The arrangement sequence of various electrodes in FIG. 9 and FIG. 8 is the same, and the relative relationship between the first electrode layer 710 and the second electrode layer 720 is also the same (i.e. the first electrode layer 710 is located over the second electrode layer 720). The difference between the touch panel 900 in FIG. 9 and the touch panel 800 in FIG. 8 merely is the layout of the first receiving line 622. Specifically, the first electrode layer 710 is located below the second electrode layer 720, as shown in FIG. 7, and the first electrode layer 710 is located over the second electrode layer 720, as shown in FIG. 10.

More specifically, as shown in FIG. 9, the first receiving electrodes 620a, 620d, 620g connect to one first receiving line 622, the first receiving electrodes 620b, 620e, 620h connect to one first receiving line 622, and the first receiving electrode 620c, 620f, 620i connect to one first receiving line 622.

Figure 11:
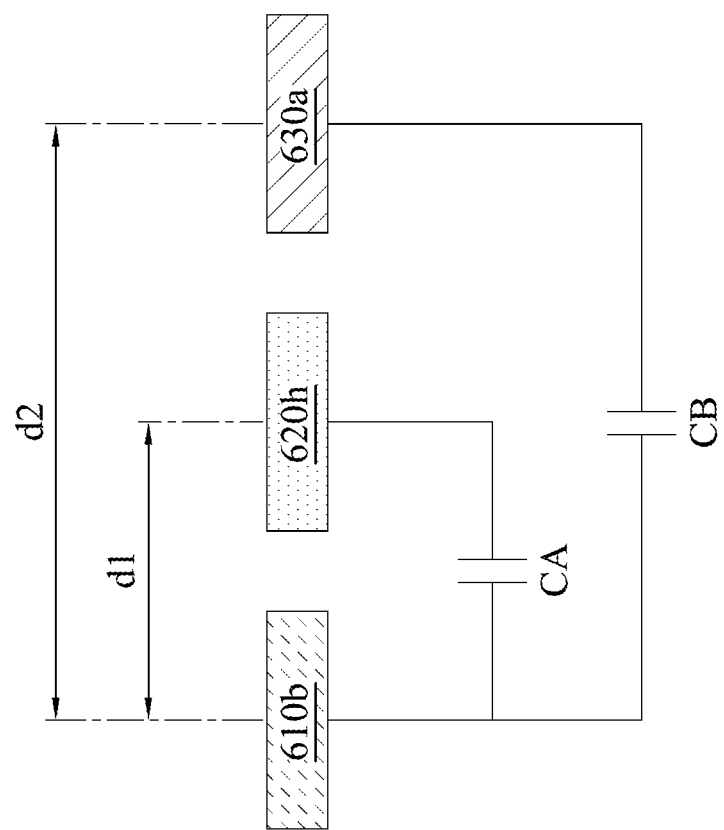
FIG. 11 is a schematic diagram illustrating capacitances between electrodes in accordance with a line A-A in FIG. 6.

Please refer to FIG. 11 and FIG. 6. FIG. 11 is a schematic diagram illustrating capacitances between electrodes in accordance with a line A-A in FIG. 6. A touch location 650 can be the location where a conductive or non-conductive object touches (or approaches) the touch panel 600. The touch location 650 in FIG. 6 covers the second receiving electrode 630, the first receiving electrode 620h and the driving electrode 610b. The first receiving electrode 620h is disposed between the driving electrode 610b and the second receiving electrode 630a. In other words, a distance d1 between the driving electrode 610b and the first receiving electrode 620h is smaller than a distance d2 between the driving electrode 610b and the second receiving electrode 630a. A capacitance CA is formed between the driving electrode 610b and the first receiving electrode 620h, and a capacitance CB is formed between the driving electrode 610b and the second receiving electrode 630a. When the conductive or non-conductive object touches (or approaches) the touch location 650, the capacitance CA and the capacitance CB will change, and a corresponding induction signal will be generated. The induction signal is received by the processor 210 of the display panel 120 to determine whether the touch occurs and the embedded system 318 of the computer system 300 determine the touch location. When the conductive object touches (or approaches) the touch location 650, both the capacitance CA and the capacitance CB will decrease. When the non-conductive object touches (or approaches) the touch location 650, the capacitance CA will decrease and the capacitance CB will increase. The changes of the capacitance CA and the capacitance CB are used to determine whether the touch object is a conductor or a non-conductor object.

Figure 12:
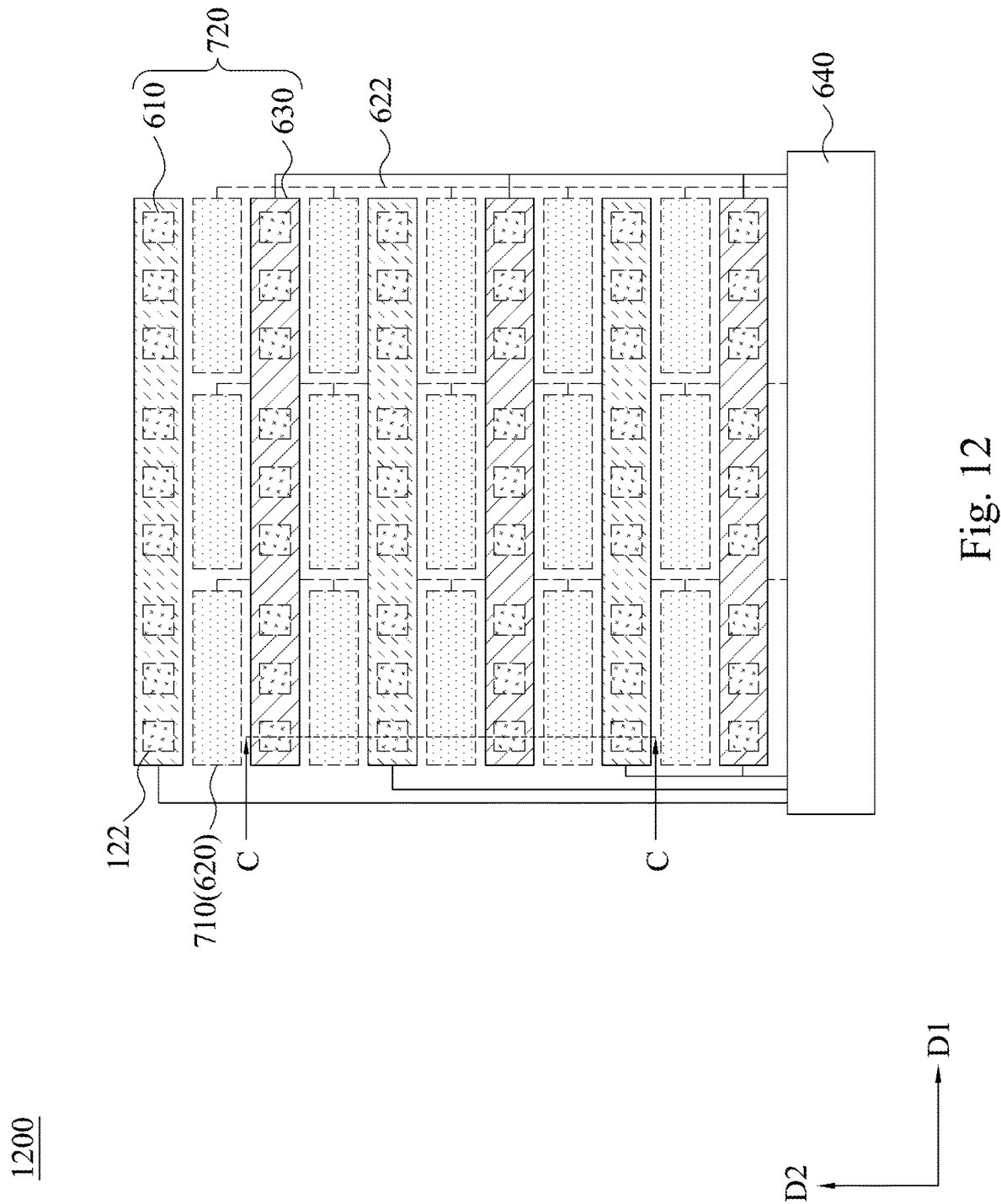
FIG. 12 is a top view of a touch panel in accordance with some embodiments of the present disclosure.
Figure 13:
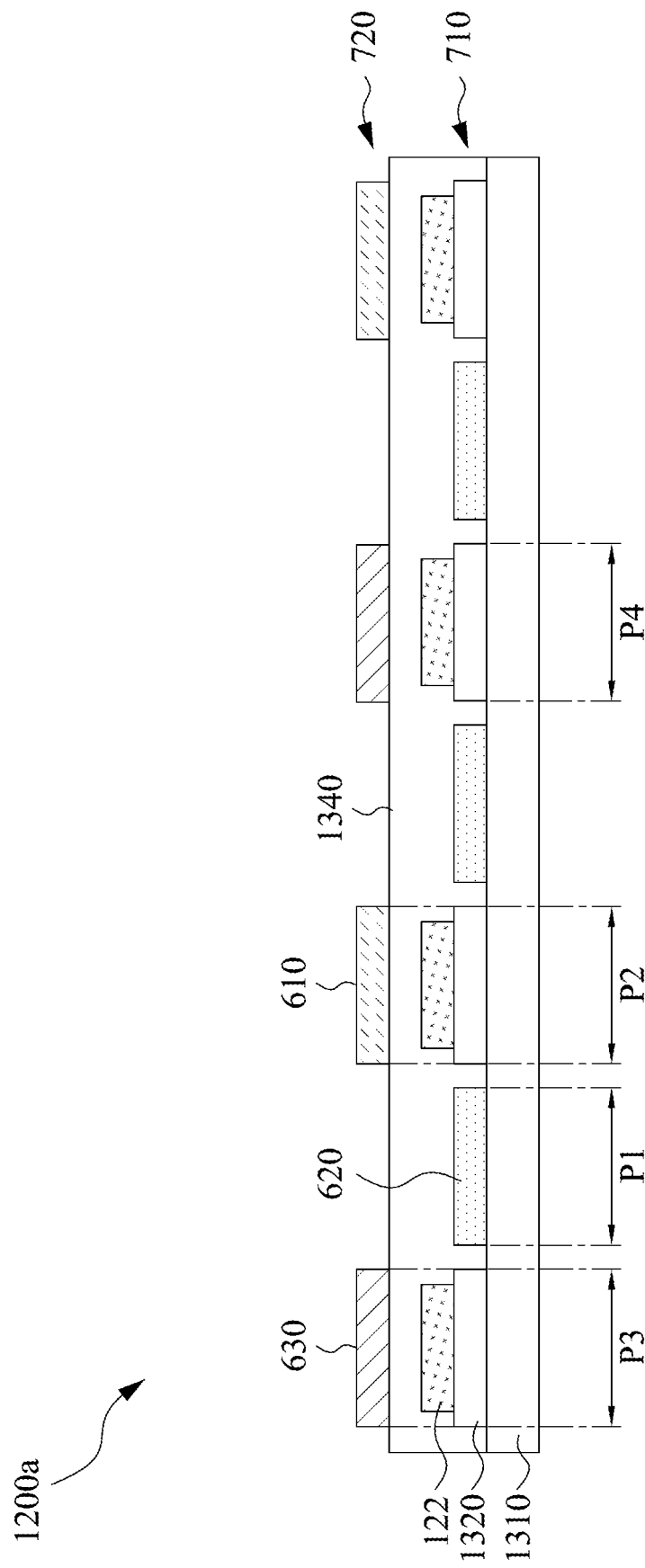
FIG. 13 to FIG. 15 respectively are cross-sectional views illustrating different embodiments in accordance with a line C-C in FIG. 12.
Figure 14:
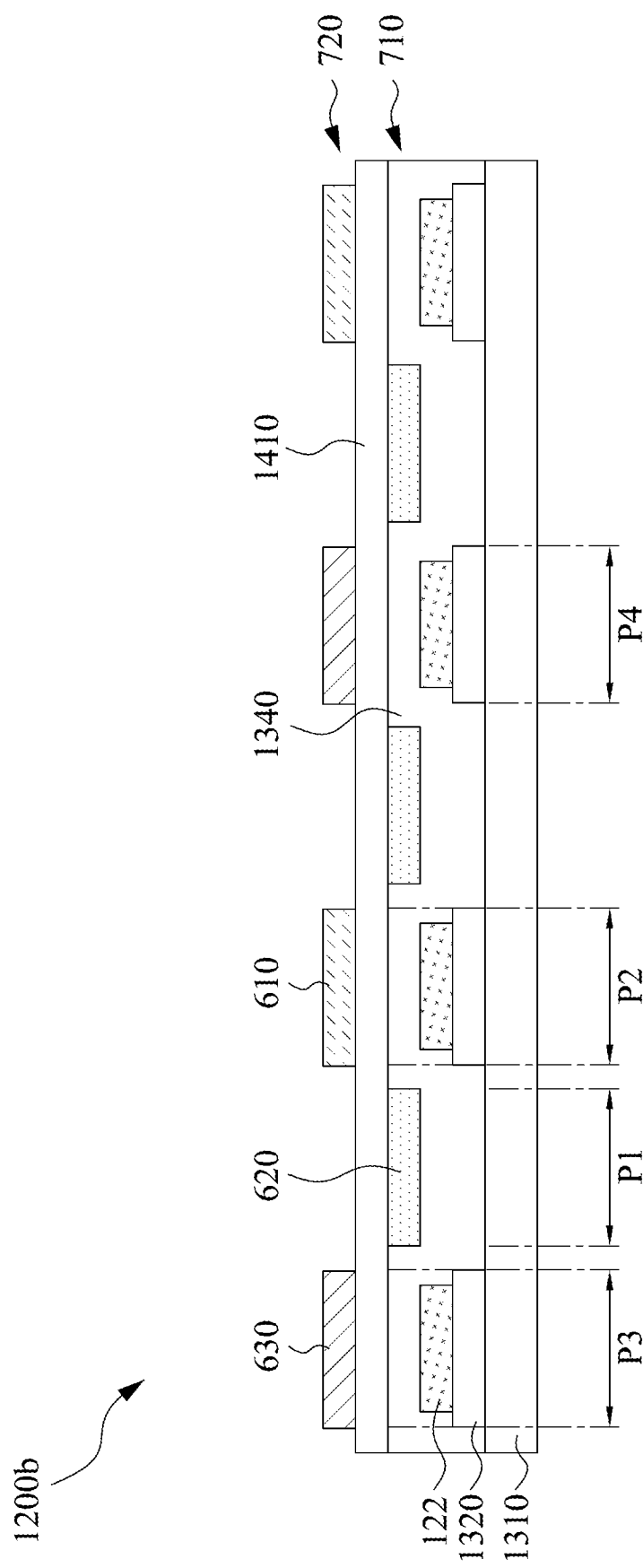
Figure 15:
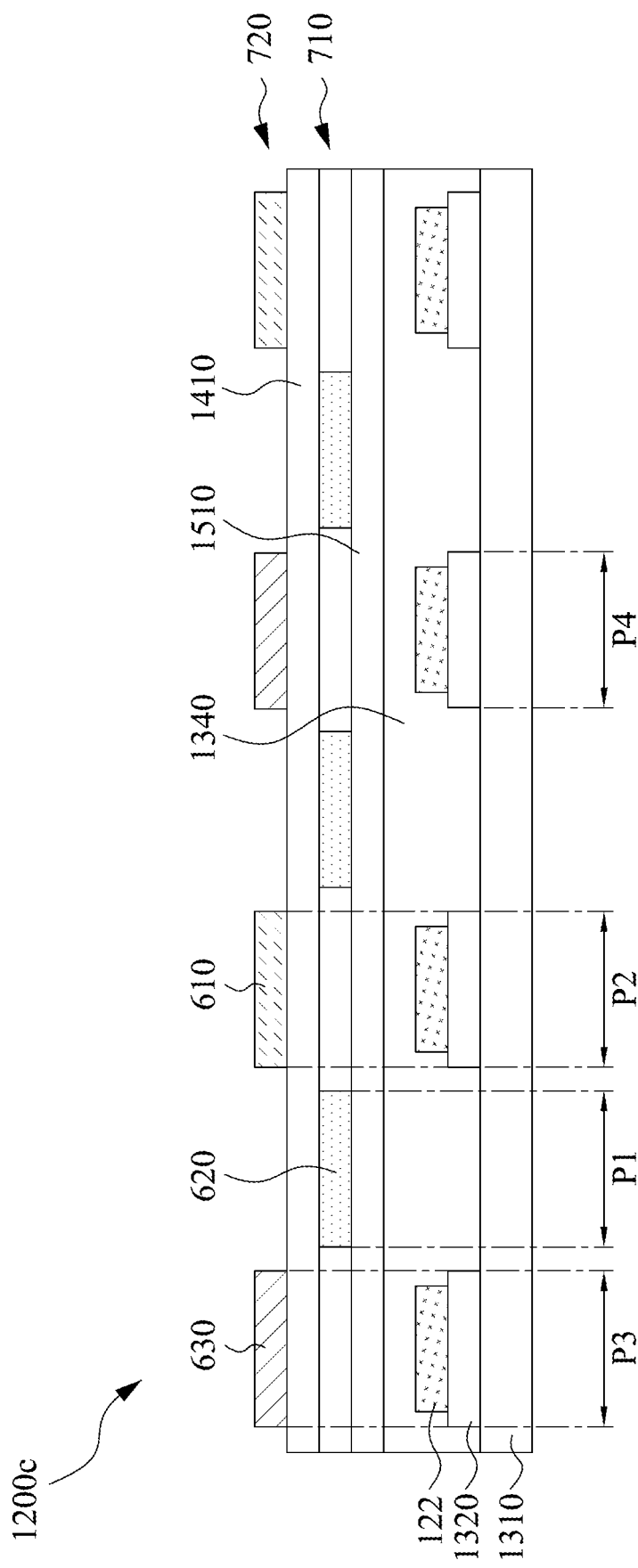

FIG. 12 is a top view of a touch panel 1200 in accordance with some embodiments of the present disclosure. FIG. 13 to FIG. 15 respectively are cross-sectional views illustrating different embodiments in accordance with a line C-C in FIG. 12. The structure of each figure will be described in detail below.

Please refer to FIG. 12. The difference between the touch panel 1200 in FIG. 12 and the touch panel 600 in FIG. 6 is that the touch panel 1200 further includes multiple light emitting diodes 122. Specifically, the first receiving electrode 620 is located below the driving electrode 610 and the second receiving electrode 630. The light emitting diodes 122 are located below the driving electrode 610 and the second receiving electrode 630. Please refer to FIG. 13 to FIG. 15 for the relative positions of the light emitting diodes 122 and other components. In the embodiment of FIG. 12, the driving electrode 610 and the second receiving electrode 630 can be transparent electrodes, for example, indium tin oxide (ITO), and the first receiving electrode 620 can be transparent or opaque electrode.

Please refer to FIG. 13 to FIG. 15. A touch panel 1200a, 1200b, 1200c respectively includes a substrate 1310, a thin film transistor 1320, the light emitting diode 122, the driving electrode 610, the first receiving electrode 620, the second receiving electrode 630 and a insulation layer 1340. In some embodiments, the substrate 1310 can be a thin film transistor substrate, a glass substrate, a flexible substrate, a printed circuit board or other suitable substrates. In some embodiments, the light emitting diode 122 can be a monochromatic light or a RGB light. The insulation layer 1340 is disposed on the substrate 1310, and disposed between the driving electrode 610, the first receiving electrode 620 and the second receiving electrode 630 to electrically insulate different electrodes. In some embodiments, each thin film transistor 1320 can selectively drive each light emitting diode 122 by controlling the current in the light emitting diode 122. Each thin film transistor 1320 can be used as a switch for controlling a pixel, and can be a basic unit of the display.

As shown in FIG. 13, in some embodiments, the touch panel 1200a includes the thin film transistors 1320 disposed on the substrate 1310, and the thin film transistors 1320 are alternately disposed with first receiving electrode 620 in the first electrode layer 710. Specifically, the thin film transistor 1320 and the first receiving electrode 620 are located on the same layer. In some embodiments, an insulation layer (not shown) is disposed around the driving electrode 610 and the second receiving electrode 630, so that the driving electrode 610 is electrically insulated from the second receiving electrode 630. As shown in FIG. 12 and FIG. 13, in such embodiment, the thin film transistor 1320, the first receiving electrode 620 and the first receiving line 622 can be formed on the substrate 1310 at the same time. Subsequently, the light emitting diode 122 and the insulation layer 1340 are formed on the thin film transistor 1320, and then the driving electrode 610, the driving electrode line 612, the receiving electrode 630 and the second receiving line 632 are formed on the insulation layer 1340.

As shown in FIG. 14, in some embodiments, the touch panel 1200b further includes a first insulating film 1410 disposed between the first receiving electrode 620 and the driving electrode 610 and the second receiving electrode 630. In other words, the first insulating film 1410 is disposed between the first electrode layer 710 and the second electrode layer 720. In some embodiments, the second electrode layer 720 is disposed over the first insulating film 1410, the first electrode layer 710 is disposed between the substrate 1310 and the first insulating film 1410. In some embodiments, the first insulating film 1410 can be a polymer film, for example, a polyimide film. In some embodiments, an insulation layer (not shown) is disposed around the driving electrode 610 and the second receiving electrode 630, so that the driving electrode 610 is electrically insulated from the second receiving electrode 630.

As shown in FIG. 15, in some embodiments, the touch panel 1200c further includes the first insulating film 1410 and a second insulating film 1510. The first insulating film 1410 is disposed between the first receiving electrode 620 and the driving electrode 610 and the second receiving electrode 630. The second insulating film 1510 is disposed below the first receiving electrode 620. In other words, the first insulating film 1410 is disposed between the first electrode layer 710 and the second electrode layer 720, and the second insulating film 1510 is disposed below the first electrode layer 710. The second insulating film 1510 is disposed between the first electrode layer 710 and the substrate 1310. In some embodiments, the second insulating film 1510 can be a polymer film, for example, a polyimide film. In such embodiment, the touch panel 1200c is a glass/film/film (GF2) structure. In some embodiments, the first electrode layer 710 and the second electrode layer 720 are respectively formed on two sides of the first insulating film 1410 to form a glass/film/film touch layer, and then the glass/film/film touch layer laminate the substrate 1310 having the light emitting diodes 122, thereby forming the touch panel 1200c. In some embodiments, an insulation layer (not shown) is disposed around the driving electrode 610 and the second receiving electrode 630, so that the driving electrode 610 electrically insulate from the second receiving electrode 630.

Please refer to FIG. 12 again. The first electrode layer 710 of the touch panel 1200 includes multiple first receiving electrodes 620. The first receiving electrodes 620 are separated from each other, extend along the first direction D1, and are arranged along the second direction D2 substantially perpendicular to the first direction D1. The second electrode layer 720 includes the driving electrode 610 and the second receiving electrode 630. The driving electrode 610 extends along the first direction D1. The second receiving electrode 630 separates from the driving electrode 610 and extends along the first direction D1.

Please refer to FIG. 13 to FIG. 15. The touch panels 1200a, 1200b, 1200c includes the substrate 1310, the first electrode layer 710 and the second electrode layer 720. The first electrode layer 710 is disposed over the substrate 1310. The second electrode layer 720 is disposed over the substrate 1310 and electrically insulated from the first electrode layer 710. Each of the first receiving electrodes 620 has first projection P1 on the substrate 1310, the driving electrode 610 has a second projection P2 on the substrate 1310, and the second receiving electrode 630 has a third projection P3 on the substrate 1310. The first projection P1, the second projection P2 and the third projection P3 are spaced from each other. In other words, the first projection P1, the second projection P2 and the third projection P3 are interleaved with each other. In some embodiments, the thin film transistor 1320 is disposed on the substrate 1310, in which the thin film transistor 1320 has a fourth projection P4 on the substrate 1310, and the fourth projection P4 overlaps the second projection P2. In some embodiments, the fourth projection P4 overlaps the third projection P3. In some embodiments, the fourth projection P4 overlaps the second projection P2, and the fourth projection P4 overlaps the third projection P3. In some embodiments, the light emitting diode 122 is disposed between the thin film transistor 1320 and the driving electrode 610. In some embodiments, the light emitting diode 122 is disposed between the thin film transistor 1320 and the second receiving electrode 630.

Figure 16:
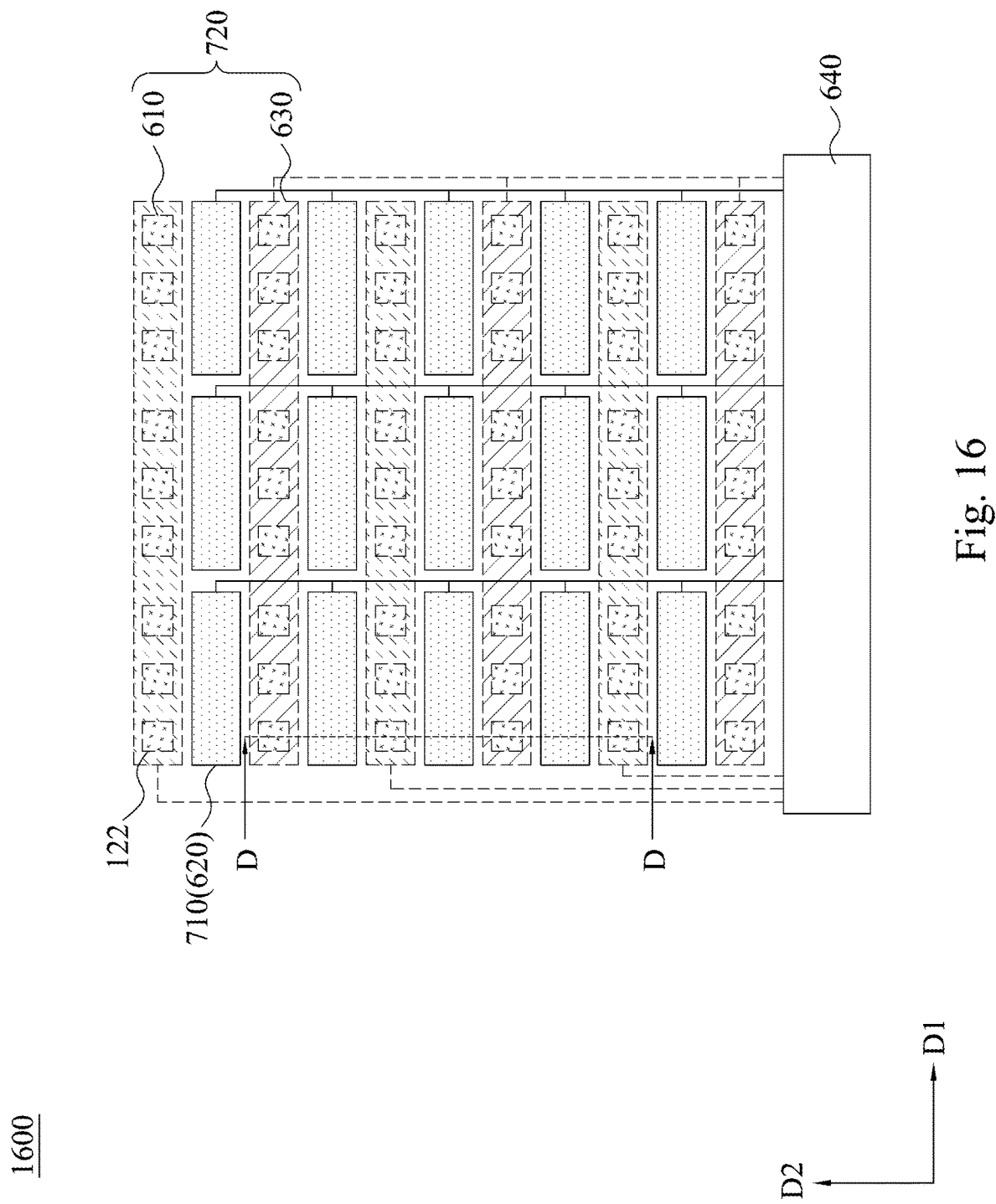
FIG. 16 is a top view of a touch panel in accordance with some embodiments of the present disclosure.
Figure 17:
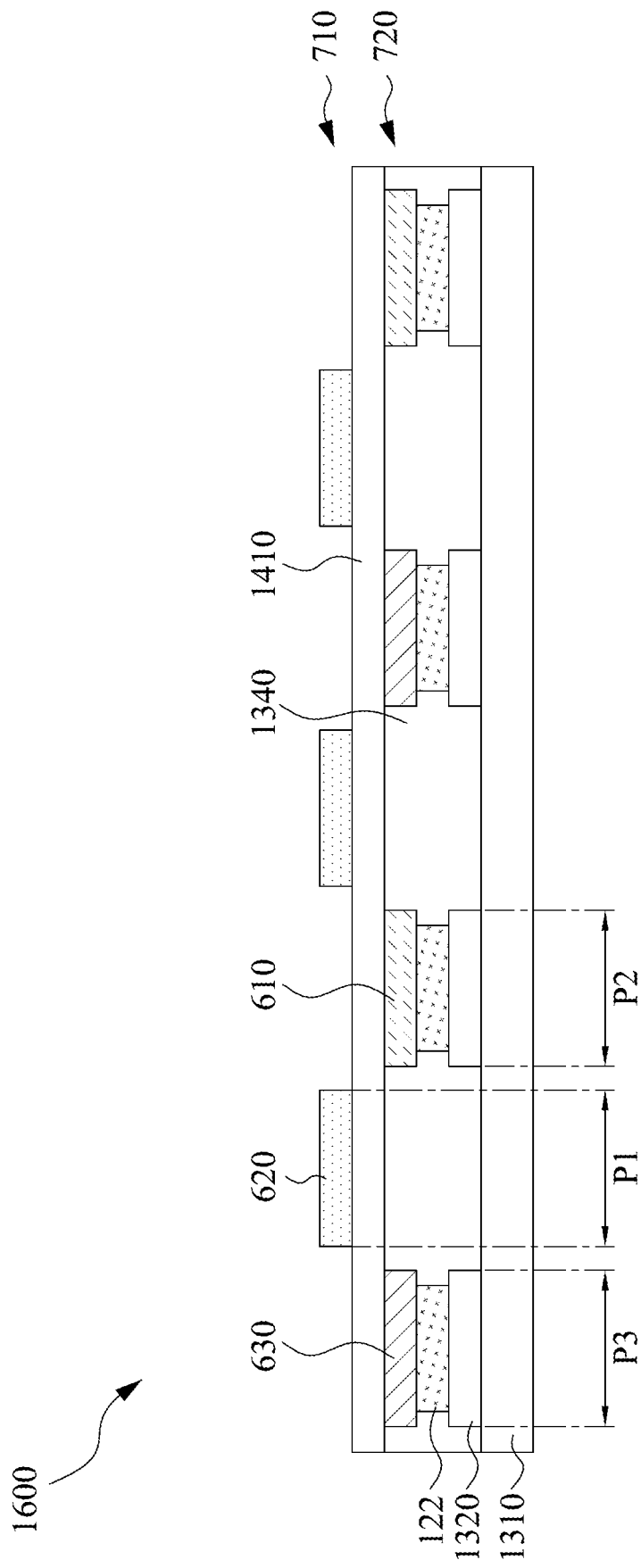
FIG. 17 is a cross-sectional view illustrating an embodiment in accordance with a line D-D in FIG. 16.

FIG. 16 is a top view of a touch panel 1600 in accordance with some embodiments of the present disclosure. FIG. 17 is a cross-sectional view illustrating an embodiment in accordance with a line D-D in FIG. 16.

Please refer to FIG. 16. The difference between the touch panel 1600 in FIG. 16 and the touch panel 800 in FIG. 8 is that the touch panel 1600 further includes multiple light emitting diodes 122. In other words, the driving electrode 610 and the second receiving electrode 630 are located below the first receiving electrode 620. The light emitting diode 122 is disposed below the driving electrode 610 and the second receiving electrode 630. Please refer to FIG. 17 for the relative positions of the light emitting diode 122 and other components. In the embodiment of FIG. 16, the driving electrode 610 and the second receiving electrode 630 can be transparent electrodes, for example, indium tin oxide (ITO), and the first receiving electrode 620 can be transparent or opaque electrode.

As shown in FIG. 17, the touch panel 1600 includes the substrate 1310, the thin film transistor 1320, the light emitting diode 122, the driving electrode 610, the first receiving electrode 620, the second receiving electrode 630, the insulation layer 1340 and the first insulating film 1410. The insulation layer 1340 is disposed on the substrate 1310, and is disposed between the driving electrode 610 and the second receiving electrode 630 to electrically insulate different electrodes. In some embodiments, an insulation layer (not shown) is disposed around the first receiving electrodes 620, so that the first receiving electrodes 620 are electrically insulated from each other. Other identical or similar components and reference numerals are described hereinabove, and the details thereof are not repeatedly described. In some embodiments, the first electrode layer 710 (including the first receiving electrode 620) is disposed over the first insulating film 1410, the second electrode layer 720 (including the driving electrode 610 and the second receiving electrode 630) are disposed between the substrate 1310 and the first insulating film 1410.

Please refer to FIG. 16 again. The first electrode layer 710 of the touch panel 1600 includes multiple first receiving electrodes 620, multiple first receiving electrodes 620 are separated from each other, extend along the first direction D1, and are arranged along the second direction D2 substantially perpendicular to the first direction D1. The second electrode layer 720 includes the driving electrode 610 and the second receiving electrode 630. The driving electrode 610 extends along the first direction D1. The second receiving electrode 630 separates from the driving electrode 610 and extends along the first direction D1.

Please refer to FIG. 17 again. The touch panel 1600 includes the substrate 1310, the first electrode layer 710 and the second electrode layer 720. The first electrode layer 710 is disposed over the substrate 1310. The second electrode layer 720 is disposed over the substrate 1310 and electrically insulates from the first electrode layer 710. Each of the first receiving electrodes 620 has the first projection P1 on the substrate 1310, the driving electrode 610 has the second projection P2 on the substrate 1310, and the second receiving electrode 630 has the third projection P3 on the substrate 1310. The first projection P1, the second projection P2 and the third projection P3 are spaced apart from each other. In some embodiments, the first insulating film 1410 is disposed between the first electrode layer 710 and the second electrode layer 720. The first electrode layer 710 is disposed over the first insulating film 1410, and the second electrode layer 720 is disposed between the substrate 1310 and the first insulating film 1410.

Figure 18:
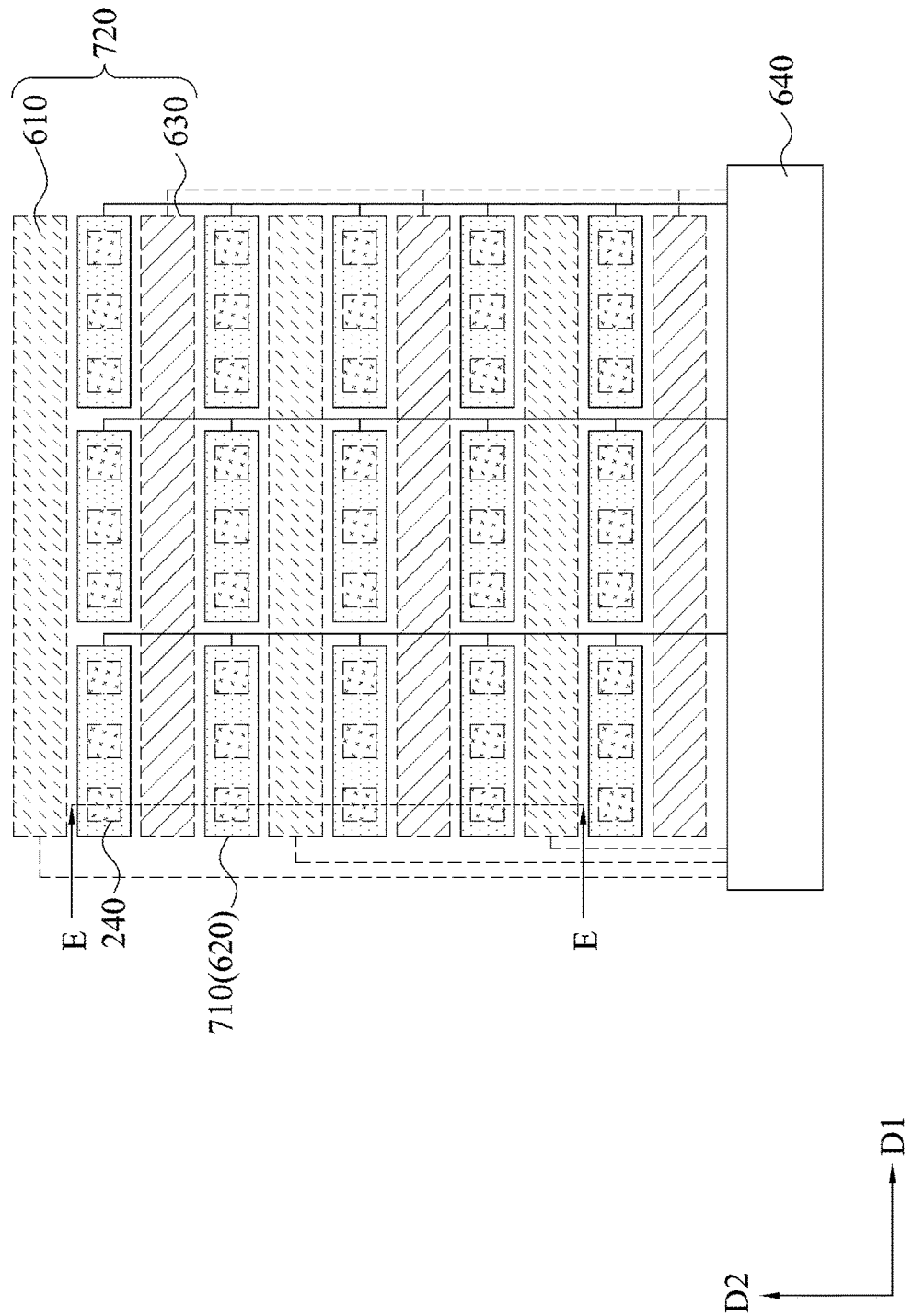
FIG. 18 is a top view of a touch panel in accordance with some embodiments of the present disclosure.
Figure 19:
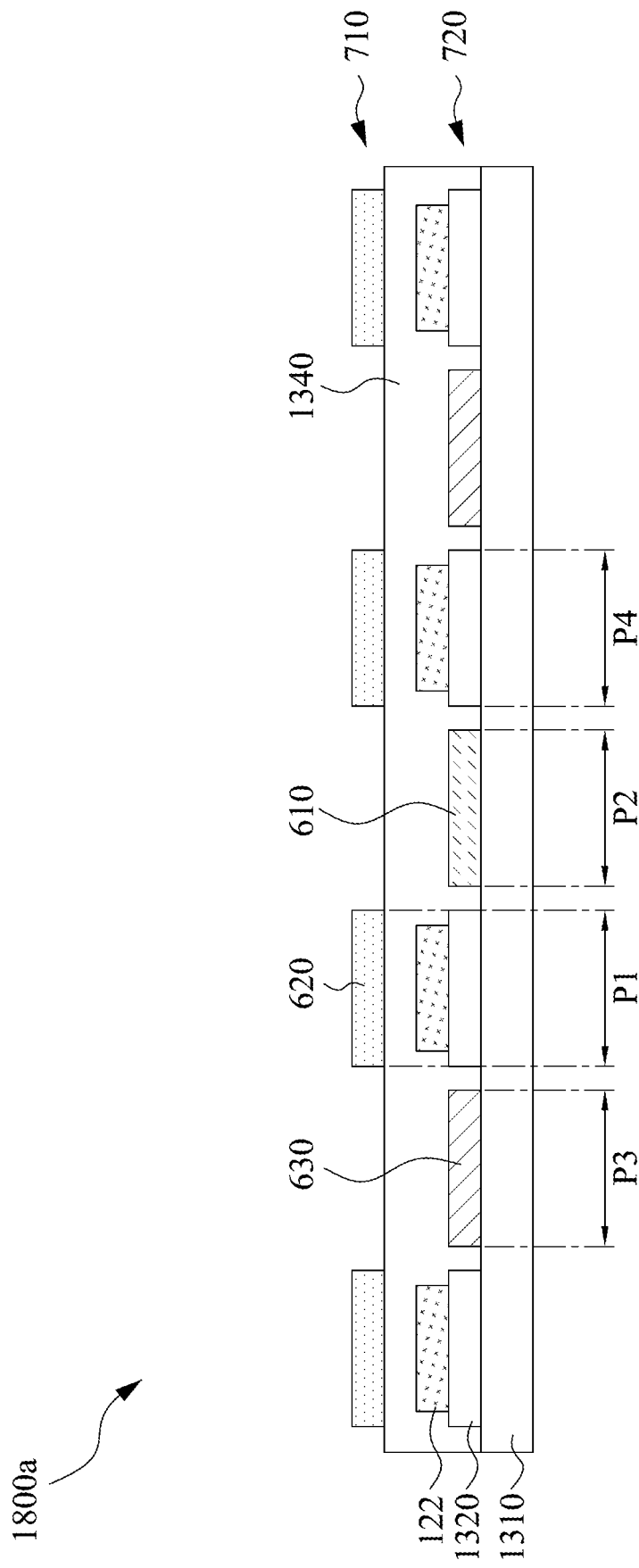
FIG. 19 and FIG. 20 respectively are cross-sectional views illustrating different embodiments in accordance with a line E-E in FIG. 18.
Figure 20:
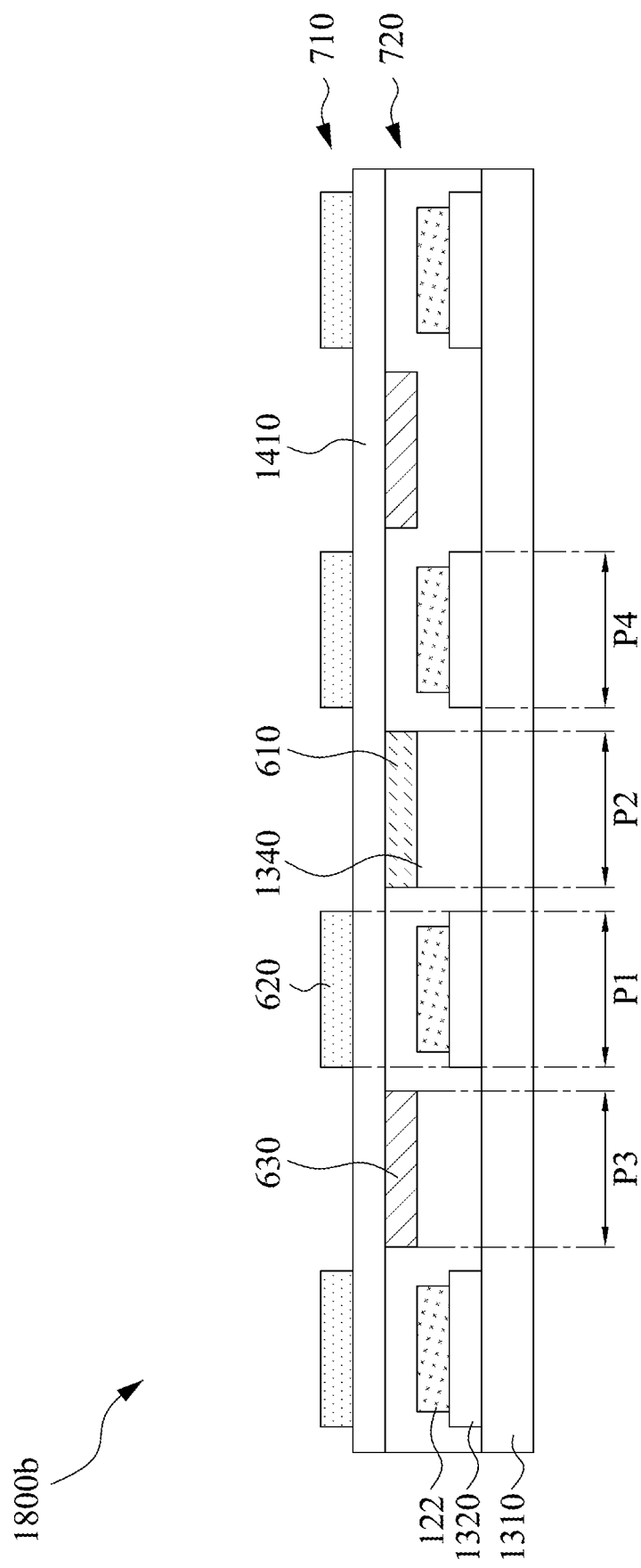

FIG. 18 is a top view of a touch panel 1800 in accordance with some embodiments of the present disclosure. FIG. 19 and FIG. 20 respectively are cross-sectional views illustrating different embodiments in accordance with a line E-E in FIG. 18.

Please refer to FIG. 18. The difference between the touch panel 1800 in FIG. 18 and the touch panel 800 in FIG. 8 is that the touch panel 1800 further includes multiple light emitting diodes 122. The driving electrode 610 and the second receiving electrode 630 are located below the first receiving electrode 620. The light emitting diodes 122 are disposed below the first receiving electrode 620. Please refer to FIG. 19 and FIG. 20 for the relative positions of the light emitting diodes 122 and other components. The difference between the touch panel 1800 in FIG. 18 and the touch panel 1600 in FIG. 16 is the position of the light emitting diodes 122. In the embodiment of FIG. 18, the first receiving electrode 620 can be transparent electrode, for example, indium tin oxide (ITO), and the driving electrode 610 and the second receiving electrode 630 can be transparent or opaque electrodes.

Please refer to 19 and FIG. 20. The touch panels 1800a, 1800b includes the substrate 1310, the thin film transistor 1320, the light emitting diode 122, the driving electrode 610, the first receiving electrode 620, the second receiving electrode 630 and the insulation layer 1340. The insulation layer 1340 is disposed on the substrate 1310, and is disposed between the driving electrode 610, the first receiving electrode 620 and the second receiving electrode 630 to electrically insulate different electrodes.

As shown in FIG. 19, in some embodiments, the touch panel 1800a includes the thin film transistor 1320 disposed on the substrate 1310, and the thin film transistor 1320 is alternately disposed with the driving electrode 610 and the second receiving electrode 630 of the second electrode layer 720. Specifically, the thin film transistor 1320, the driving electrode 610 and the second receiving electrode 630 are located on the same layer. In such embodiments, during the process of forming the substrate 1310, the driving electrode 610 can be formed at the same time. Subsequently, the light emitting diode 122 and the insulation layer 1340 are formed, and then the first receiving electrode 620 and the first receiving line 622 are formed on the insulation layer 1340. In some embodiments, an insulation layer (not shown) is disposed around the first receiving electrodes 620, so that the first receiving electrodes 620 are electrically insulated from each other. Other identical or similar components and reference numerals are described hereinabove, and the details thereof are not repeatedly described.

As shown in FIG. 20, in some embodiments, the touch panel 1800b further includes the first insulating film 1410 disposed between the first receiving electrode 620 and the driving electrode 610 and the second receiving electrode 630. In other words, the first insulating film 1410 is disposed between the first electrode layer 710 and the second electrode layer 720. The first electrode layer 710 is disposed above the first insulating film 1410, and the second electrode layer 720 is disposed between the substrate 1310 and the first insulating film 1410. Other identical or similar components and reference numerals are described hereinabove, and the details thereof are not repeatedly described.

Please refer to FIG. 18 again. The first electrode layer 710 of the touch panel 1800 includes multiple first receiving electrodes 620. The first receiving electrodes 620 are separated from each other, extend along the first direction D1, and are arranged along the second direction D2 substantially perpendicular to the first direction D1. The second electrode layer 720 includes the driving electrode 610 and the second receiving electrode 630. The driving electrode 610 extends along the first direction D1. The second receiving electrode 630 separates from the driving electrode 610 and extends along the first direction D1.

Please refer to FIG. 19 and FIG. 20 again. The touch panels 1800a, 1800b includes the substrate 1310, the first electrode layer 710 and the second electrode layer 720. The first electrode layer 710 and the second electrode layer 720 are disposed over the substrate 1310, and the first electrode layer 710 is disposed over the second electrode layer 720. The first electrode layer 710 electrically insulates from the second electrode layer 720. Each of the first receiving electrodes 620 has the first projection P1 on the substrate 1310, the driving electrode 610 has the second projection P2 on the substrate 1310, the second receiving electrode 630 has the third projection P3 on the substrate 1310. The first projection P1, the second projection P2 and the third projection P3 are spaced apart from each other. In some embodiments, the thin film transistor 1320 is disposed on the substrate 1310, and is alternately disposed with the driving electrode 610 of the second electrode layer 720 and the second receiving electrode 630. In some embodiments, the light emitting diode 122 is disposed between the thin film transistor 1320 and the first receiving electrode 620. In some embodiments, the thin film transistor 1320 is disposed on the substrate 1310, in which the thin film transistor 1320 has the fourth projection P4 on the substrate 1310, and the fourth projection P4 overlaps the first projection P1. In some embodiments, the thin film transistor 1320 is disposed on the substrate 1310, in which the thin film transistor 1320 has the fourth projection P4 on the substrate 1310, the fourth projection P4 overlaps the second projection P2, and the fourth projection P4 overlaps the third projection P3.

Figure 21:
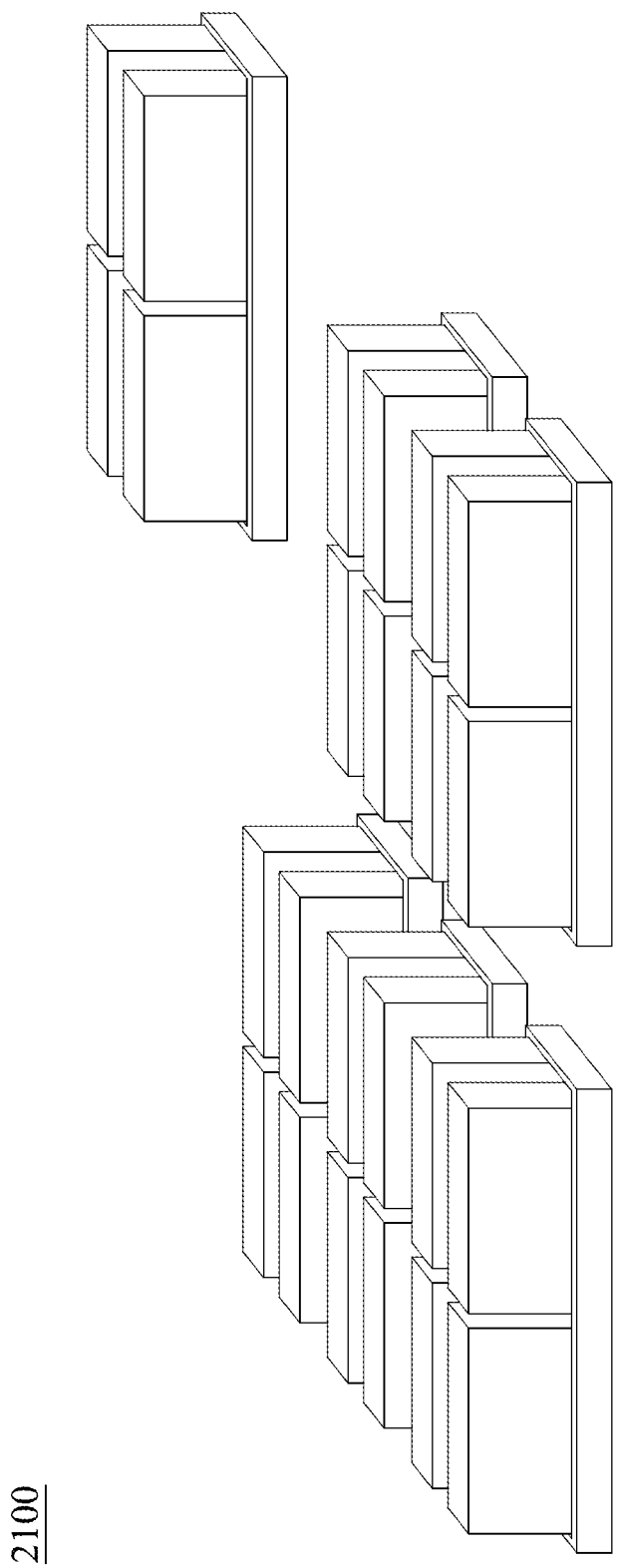
FIG. 21 is a schematic diagram illustrating a driver integrated circuit in accordance with some embodiments of the present disclosure.

FIG. 21 is a schematic diagram illustrating a driver integrated circuit 2100 in accordance with some embodiments of the present disclosure. The driver integrated circuit 2100 can modify circuits through IC trimming to adjust to the required performance functions. The driver integrated circuit 2100 can be used to drive the driving electrode 610, the first receiving electrode 620 and the second receiving electrode 630. In some embodiments, the driver integrated circuit 2100 in the touch sensor unit 640 is a common driver integrated circuit. In other words, the driver integrated circuit 2100 can connect to the driving electrode line 612, the first receiving line 622 and the second receiving line 632 at the same time. In some embodiments, the driver integrated circuit 2100 can be a micro driver integrated circuit.

Figure 22:
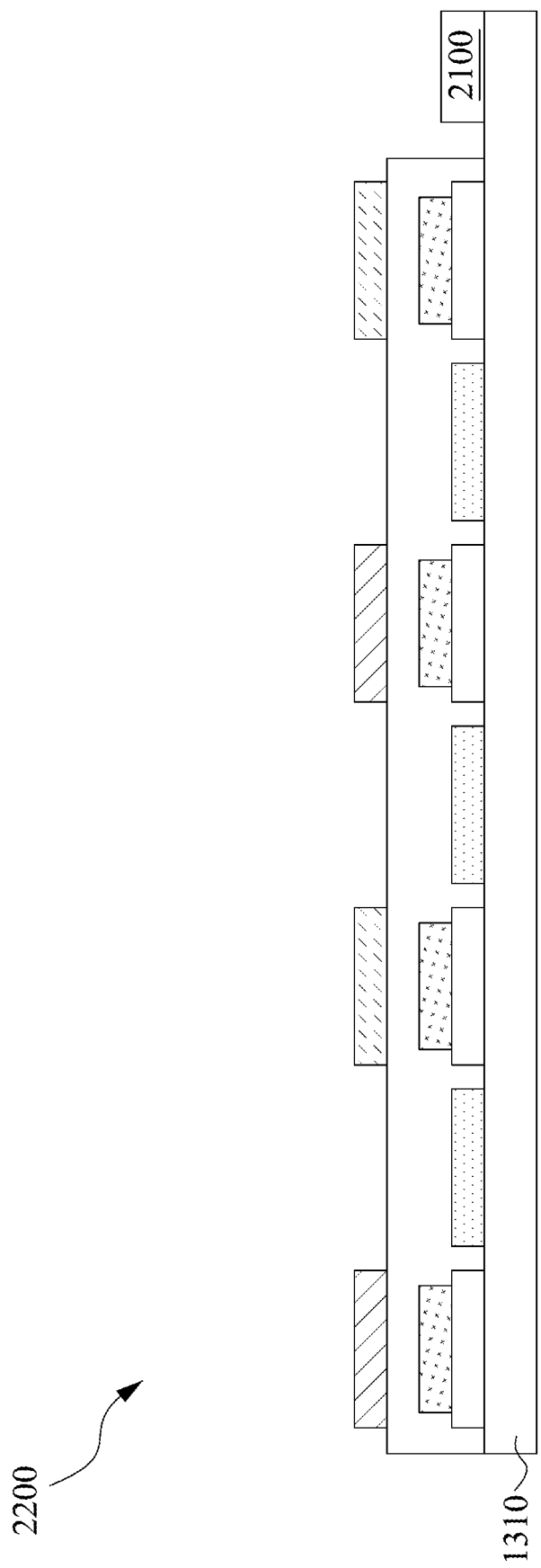
FIG. 22 and FIG. 23 are schematic diagrams illustrating a touch panel attached to a substrate in accordance with some embodiments of the present disclosure.
Figure 23:
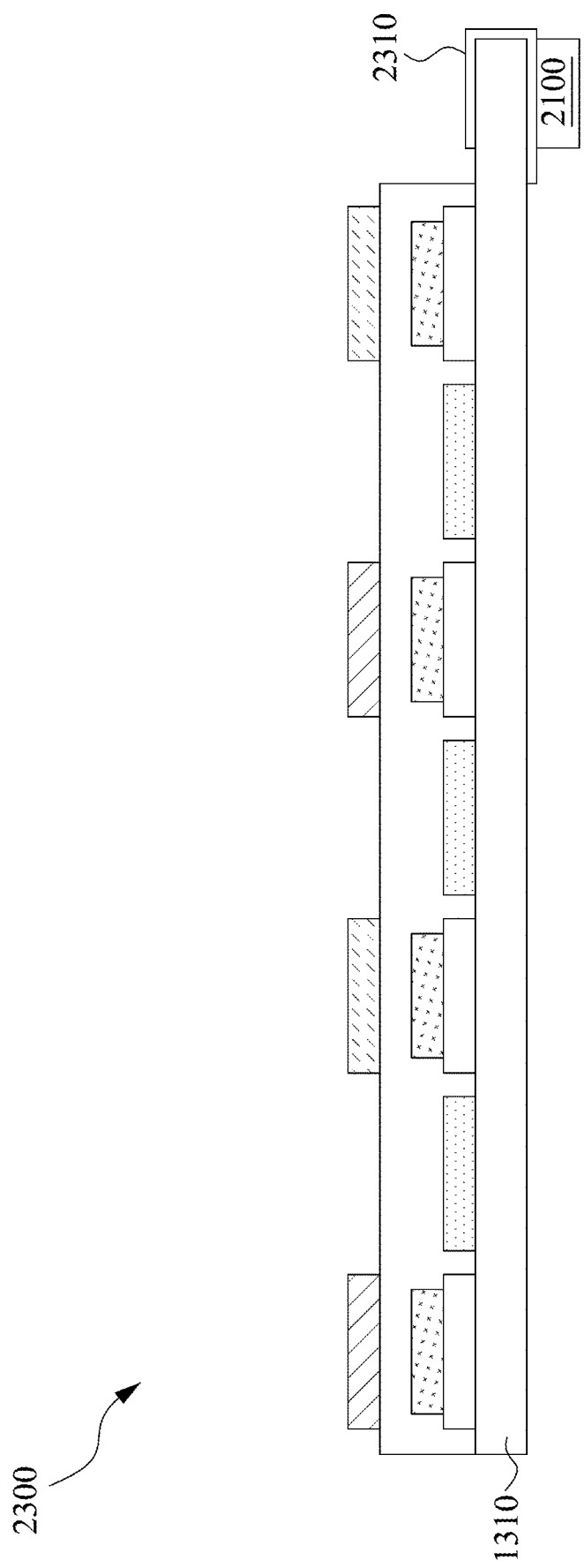

FIG. 22 and FIG. 23 are schematic diagrams illustrating a touch panel attached to the substrate 1310 in accordance with some embodiments of the present disclosure. However, the touch panel 1600 and the touch panel 1800 alternately can also be used to implement the embodiments shown in FIG. 22 and FIG. 23.

Please refer to FIG. 22. The difference between the touch panel 2200 in FIG. 22 and the touch panel 1200a in FIG. 13 is that the touch panel 2200 further includes the driver integrated circuit 2100. The driver integrated circuit 2100 is disposed on the substrate 1310. In one embodiment, the driver integrated circuit 2100 is attached to the substrate 1310 using the chip on glass (COG) packaging technique. In such embodiment, the substrate 1310 is a substrate. In an alternative embodiment, the driver integrated circuit 2100 is attached to the substrate 1310 using chip on board (COB) packaging technique. In such alternative embodiment, the substrate 1310 is a printed circuit board.

Please refer to FIG. 23. The difference between the touch panel 2300 in FIG. 23 and the touch panel 1200a in FIG. 13 is that the touch panel 2300 further includes the driver integrated circuit 2100 and a flexible substrate 2310. The flexible substrate 2310 is disposed on the substrate 1310, and the driver integrated circuit 2100 is disposed on the flexible substrate 2310. In one embodiment, the driver integrated circuit 2100 is attached to the substrate 1310 using the chip on film (COF) packaging technique. Specifically, the driver integrated circuit 2100 is mounted on the flexible substrate 2310, and the flexible substrate 2310 is folded back from the front side of the substrate 1310 to the back side of the substrate 1310. The touch panel 1200a shown in FIG. 23 can achieve the advantages of the narrow bezel and the full screen. In such embodiment, the substrate 1310 is a printed circuit board.

As mentioned above, the present disclosure provides the touch electrodes that can determine whether the touch object is a conductor or a non-conductor object by the changes of the capacitance CA and the capacitance CB. Furthermore, the second receiving electrode of the touch electrodes in the present disclosure is a common receiving electrode. Therefore, one second receiving line connects to multiple second receiving electrodes. In addition, one first receiving line also connects to multiple first receiving electrodes. Therefore, compared with conventional touch panels, the touch electrodes of the present disclosure can reduce the number of first receiving lines and second receiving lines, so that the number of the driver integrated circuits can be reduced, thereby reducing manufacturing costs.

The present disclosure has been disclosed as hereinabove, however it is not used to limit the present disclosure. Those skilled in the art may make various changes, substitutions, and alterations herein without departing from the spirit and scope of the present disclosure. Therefore, the scope of protection of the present disclosure shall be subject to the scope of the claim attached in the application and its equivalent constructions.

What is claimed is:

1. A touch panel, comprising:
   a substrate;
   a first electrode layer disposed over the substrate, comprising:
   a plurality of first receiving electrodes, wherein the first receiving electrodes are separated from each other, extend along a first direction, and are arranged along a second direction substantially perpendicular to the first direction; and
   a second electrode layer disposed over the substrate and electrically insulated from the first electrode layer, and the second electrode layer comprising:
   a driving electrode extending along the first direction; and
   a second receiving electrode separating from the driving electrode and extending along the first direction,
   wherein each of the first receiving electrodes has a first projection on the substrate, the driving electrode has a second projection on the substrate, the second receiving electrode has a third projection on the substrate, and the first projection, the second projection and the third projection are spaced apart from each other,
   wherein the plurality of first receiving electrodes are disposed between the driving electrode and the second receiving electrode when viewed from above.

2. The touch panel of claim 1, further comprising:
   a driving electrode line connecting to the driving electrode and extending along the second direction to a touch sensor unit;
   a first receiving line connecting to the first receiving electrodes and extending along the second direction to the touch sensor unit; and
   a second receiving line connecting to the second receiving electrode and extending along the second direction to the touch sensor unit.

3. The touch panel of claim 1, wherein each of the first receiving electrodes has a first length, the driving electrode has a second length, and the first length is less than the second length.

4. The touch panel of claim 1, wherein the driving electrode has a first length, the second receiving electrode has a second length, and the first length is substantially equal to the second length.

5. The touch panel of claim 1, further comprising:
   a thin film transistor disposed on the substrate, wherein the thin film transistor has a fourth projection on the substrate, and the fourth projection overlaps the second projection.

6. The touch panel of claim 1, further comprising:
   a thin film transistor disposed on the substrate, wherein the thin film transistor has a fourth projection on the substrate, and the fourth projection overlaps the third projection.

7. The touch panel of claim 1, further comprising:
   a plurality of thin film transistors disposed on the substrate, wherein each of the thin film transistors has a fourth projection on the substrate, the fourth projection overlaps the second projection, and the fourth projection overlap the third projection.

8. The touch panel of claim 7, further comprising:
   a light emitting diode disposed between the thin film transistors and the driving electrode.

9. The touch panel of claim 7, further comprising:
   a light emitting diode disposed between the thin film transistors and the second receiving electrode.

10. The touch panel of claim 1, wherein the second electrode layer is disposed over the first electrode layer.

11. The touch panel of claim 10, further comprising:
    a plurality of thin film transistors disposed on the substrate, wherein the thin film transistors are alternately disposed with the first receiving electrodes of the first electrode layer.

12. The touch panel of claim 1, wherein the first electrode layer is disposed over the second electrode layer.

13. The touch panel of claim 12, further comprising:
    a plurality of thin film transistors disposed on the substrate, wherein the thin film transistors are alternately disposed with the driving electrode of the second electrode layer and the second receiving electrode.

14. The touch panel of claim 12, further comprising:
a light emitting diode disposed between a plurality of thin film transistors and the first receiving electrodes.

15. The touch panel of claim 12, further comprising:
a thin film transistor disposed on the substrate, wherein the thin film transistor has a fourth projection on the substrate, and the fourth projection overlaps the first projection.

16. The touch panel of claim 12, further comprising:
a thin film transistor disposed on the substrate, wherein the thin film transistor has a fourth projection on the substrate, and the fourth projection and the second projection are alternately disposed with the third projection.

17. The touch panel of claim 1, further comprising:
a first insulating film disposed between the first electrode layer and the second electrode layer.

18. The touch panel of claim 17, wherein the first electrode layer is disposed over the first insulating film, and the second electrode layer is disposed between the substrate and the first insulating film.

19. The touch panel of claim 17, wherein the second electrode layer is disposed over the first insulating film, and the first electrode layer is disposed between the substrate and the first insulating film.

20. The touch panel of claim 19, further comprising:
a second insulating film disposed between the first electrode layer and the substrate.

\* \* \* \* \*